United States Patent [19]
Marsh

[11] Patent Number: 5,539,632
[45] Date of Patent: Jul. 23, 1996

[54] MULTI-PHASE AND SHIFTED PHASE POWER DISTRIBUTION SYSTEMS

[76] Inventor: John K. Marsh, 6185 S. 400 E., Wolcottville, Ind. 46795

[21] Appl. No.: 308,653

[22] Filed: Sep. 19, 1994

Related U.S. Application Data

[63] Continuation-in-part of Ser. No. 870,880, Apr. 20, 1992, which is a continuation-in-part of Ser. No. 722,935, Jun. 28, 1991, Pat. No. 5,107,410.

[51] Int. Cl.$^6$ .................................................. H02M 5/10
[52] U.S. Cl. ...................... 363/155; 363/154; 323/361
[58] Field of Search .......................... 323/361; 363/148, 363/152, 153, 154, 155, 156

[56] References Cited

U.S. PATENT DOCUMENTS

| | | | |
|---|---|---|---|
| 412,932 | 10/1889 | Shallenberger | 307/3 |
| 771,314 | 10/1904 | Lunt | 363/154 |
| 815,765 | 3/1906 | Troy | 307/13 |
| 1,082,561 | 12/1913 | Schwarz | 307/13 |
| 1,175,320 | 3/1916 | Varley | 363/154 |
| 1,188,145 | 6/1916 | Blume . | |
| 1,480,712 | 1/1924 | Fortescue | 307/13 |
| 1,727,834 | 9/1929 | Kubler | 307/105 |
| 2,024,746 | 12/1935 | Rose et al. | 175/363 |
| 2,085,123 | 6/1937 | Rose | 175/363 |
| 2,128,055 | 8/1938 | Rose | 175/363 |
| 2,166,900 | 7/1939 | Bohn et al. | 250/27.5 |
| 2,306,226 | 12/1942 | Schrange | 307/23 |
| 2,307,527 | 1/1943 | Maslin et al. | 363/154 |
| 2,330,088 | 9/1943 | St. Palley | 307/13 |
| 2,632,878 | 3/1953 | Uhlmann | 363/154 |
| 2,634,396 | 4/1953 | Solomon | 323/18 |
| 3,211,914 | 10/1965 | Anderson | 307/3 |
| 3,942,032 | 3/1976 | Casazza | 307/148 |
| 4,053,820 | 10/1977 | Peterson et al. | 363/44 |
| 4,106,089 | 8/1978 | Fettinger | 363/153 |
| 4,473,817 | 9/1984 | Perkins | 323/361 |
| 4,689,735 | 8/1987 | Young | 363/155 |
| 4,695,933 | 9/1987 | Nguyen et al. | 363/17 |
| 4,779,181 | 10/1968 | Traver et al. | 363/154 |
| 4,833,583 | 5/1989 | Petitimbert | 363/153 |
| 4,849,870 | 7/1989 | Heinrich | 363/37 |
| 4,901,213 | 2/1990 | Bessho et al. | 363/154 |
| 5,046,963 | 9/1991 | Kelly | 439/211 |
| 5,070,441 | 12/1991 | Ashley | 363/154 |
| 5,107,410 | 4/1992 | Marsh et al. | 363/2 |

OTHER PUBLICATIONS

"Nonlinear Loads Mean Trouble", Arthur Freund, Senior Editor, Electrical Construction & Maintenance, Mar. 1988.
"Double the Neutral and Derate the Transformer–or Else!", Arthur Freund, Senior Editor, Electrical Construction & Maintenance, Dec. 1988.
"Harmonic Analyzer Helps Solve Power Problems", David Kreiss, Electrical Construction & Maintenance, Mar. 1989.

*Primary Examiner*—Jeffrey L. Sterrett
*Attorney, Agent, or Firm*—Barnes & Thornburg

[57] ABSTRACT

An arrangement for transforming electrical power is disclosed. An embodiment of the arrangement includes conductors for electrically connecting to an input source of three phase electrical power. This embodiment of the arrangement also includes a transforming device electrically connected to the conductors. The transforming device includes circuitry for transforming the input source of three phase power into at least two output phases separated from one another by approximately 180 electrical degrees. The transforming device also includes circuitry for reducing the level of instantaneous power drawn from the input source by shifting each output phase a predetermined number of electrical degrees from one of the three phases of the input source.

55 Claims, 12 Drawing Sheets

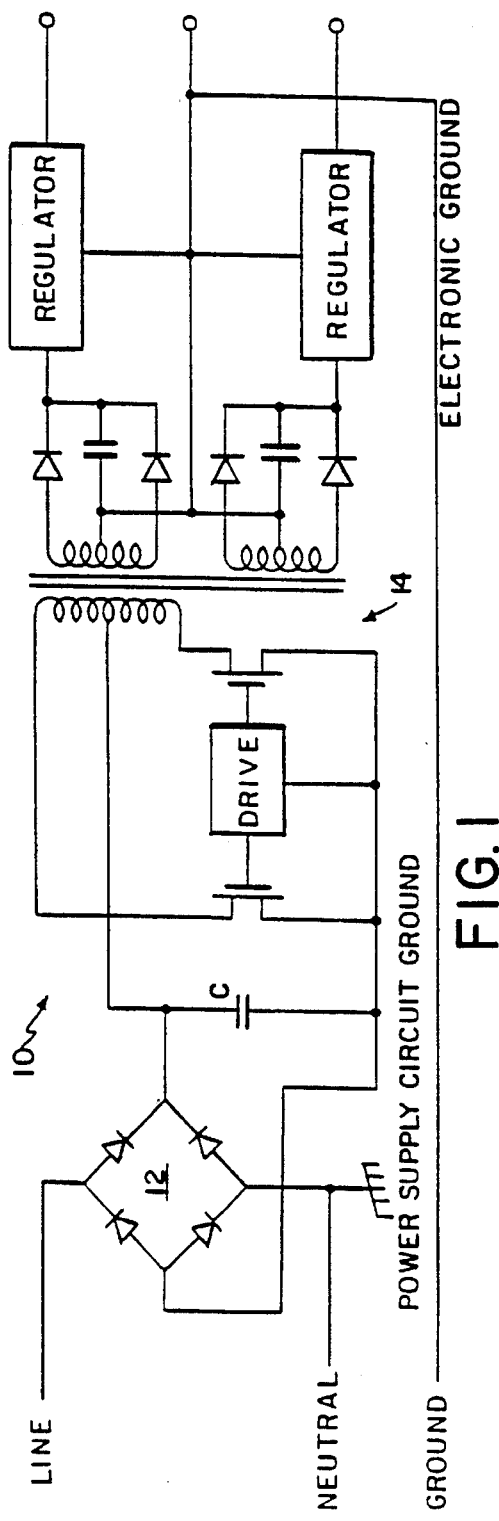
FIG. 1
PRIOR ART
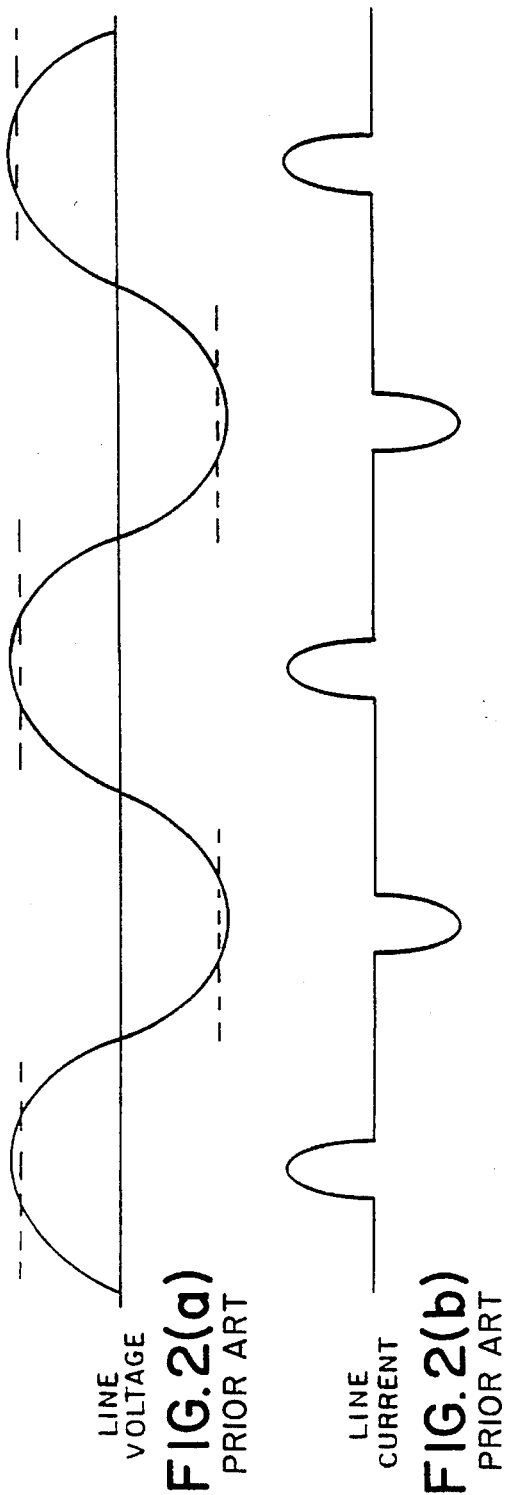
FIG. 2(a)
PRIOR ART
FIG. 2(b)
PRIOR ART

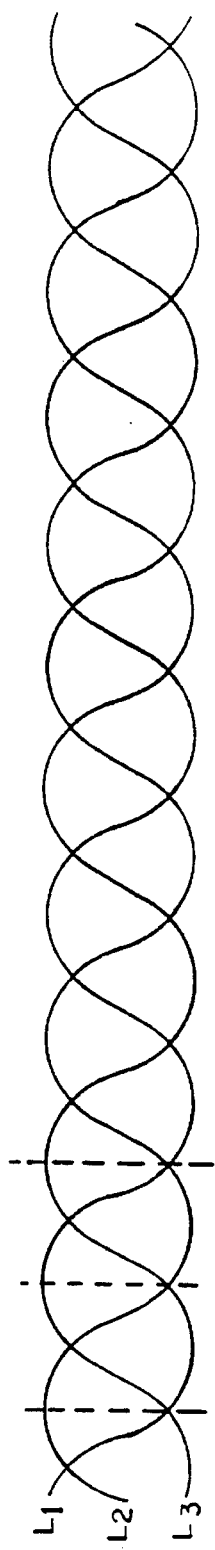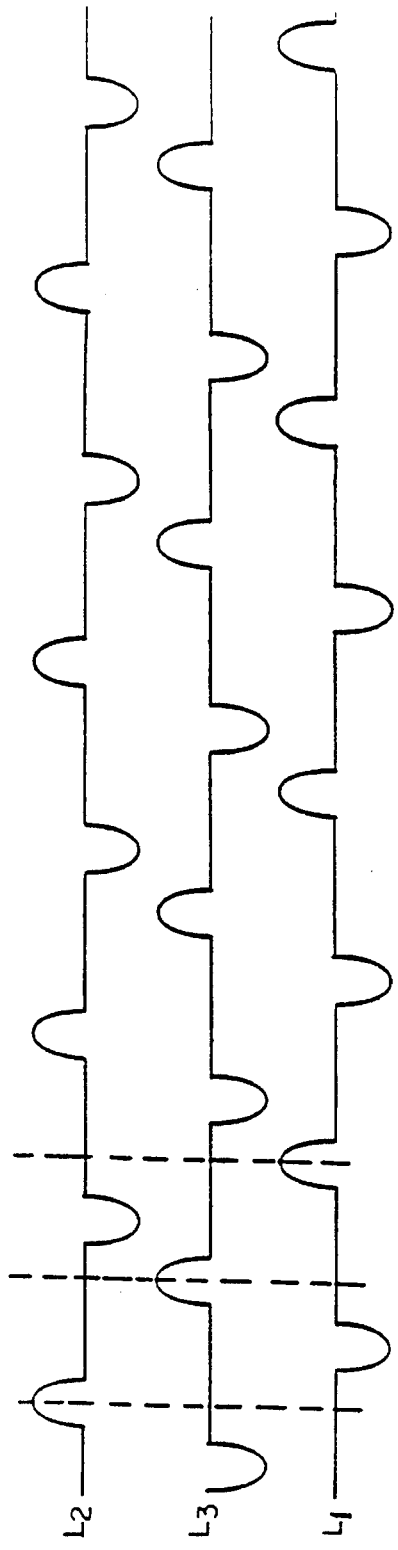
FIG.4(a) PRIOR ART
FIG.4(b) PRIOR ART
FIG.4(c) PRIOR ART

MULTI-PHASE AND SHIFTED PHASE POWER DISTRIBUTION SYSTEMS

BACKGROUND AND SUMMARY OF THE INVENTION

This application is a continuation-in-part of U.S. Ser. No. 07/870,880, filed Apr. 20, 1992, which is a continuation-in-part application of U.S. Ser. No. 07/722,935, filed Jun. 28, 1991 now U.S. Pat. No. 5,107,410.

The present invention relates generally to power distribution systems and, more particularly, to power distribution systems for offices and other environments in which power is supplied to a large number of computers or other pulsed, non-linear electrical loads.

Office power distribution systems supply electrical power to a variety of single phase and three-phase electrical loads. Typical loads have, in the past, included motors, lighting fixtures, and heating systems. These loads are, for the most part, linear in nature. When an alternating current is applied to a linear load, the current increases proportionately as the voltage increases and decreases proportionately as the voltage decreases. Resistive loads operate with a power factor of unity (i.e., the current is in phase with the voltage). In inductive circuits, current lags voltage by some phase angle resulting in circuits which operate with a power factor of less than one. In a capacitive circuit, the current leads the voltage. However, in all of these circuits, current is always proportional to the voltage and, when a sinusoidal voltage is applied to the load, the resulting current is also sinusoidal.

Until recently, almost all loads found in a typical office environment were linear loads. However, computers, variable speed motor drives, and other so-called "electronic" loads now comprise a significant and growing portion of the electrical load present in offices. These electronic loads are, for the most part, non-linear in nature. These loads have become a significant factor in many office power distribution systems, and their presence has lead to a number of problems and office power system malfunctions.

A non-linear load is one in which the load current is not proportional to the instantaneous voltage and, in many cases, is not continuous. It may, for example, be switched on for only part of a 360 electrical degree alternating current cycle.

The presence of non-linear loads on a power system can cause numerous problems. Typical office power distribution systems operate as three-phase 208/120 volt systems with a shared neutral conductor serving as a return path for currents from each of the three phases. Linear loads which are balanced among the three phases produce currents which typically cancel in the shared neutral conductor resulting in relatively low net current flow in the neutral. Pulsed currents produced by non-linear loads do not cancel in the neutral conductor because they typically do not occur simultaneously. These currents tend to add on the neutral even when the three phases of the system are carefully balanced. The resulting high current flows in the neutral conductor can lead to severe overheating or burnout of neutral conductors, and increased noise levels on the neutral. Pulsed, non-linear currents further cause relatively large variations in the instantaneous power demanded from the generator. These variations can cause problems and inefficiencies on the generator and distribution side of the transforming device. Moreover, pulsed, non-linear currents may cause typical induction watt-hour meters to show large calibration errors.

An object of the present invention is to provide a power distribution system for an office environment in which the adverse affects of pulsed, non-linear loads are reduced.

This object is achieved in a power distribution system in which three-phase electrical power is supplied to a primary side of a power transforming device, and in which at least six phases and a shared neutral conductor are provided at the secondary side of the transforming device. A plurality of electrical loads, including non-linear loads, are distributed between each of the six phases and the shared neutral so as to reduce by current cancellation the current which would otherwise flow in the shared neutral conductor due to the presence of the non-linear loads. Each of the first, second and third of the six phases provided at the output of the transforming device are preferably separated from each other by 120 electrical degrees. The fourth, fifth and sixth of these phases are also preferably separated from each other by 120 electrical degrees, and are from the first, second and third phases, respectively, by 180 electrical degrees. In a particularly preferred embodiment of the invention, at least 12 phases are produced at the secondary side of the power transforming device. Each of these 12 phases is preferably separated from the other phases by 30 electrical degrees. In this embodiment, the 12 phases may be viewed as two sets of six phases, with each of the phases in a first of the two sets shifted relative to respective phases of the second set, so as to reduce variations in the level of instantaneous power drawn from the input source which would otherwise occur due to the presence of the non-linear loads. In this preferred embodiment, the six phases in the first set are preferably shifted by 30 electrical degrees relative to respective ones of the six phases in the second set. This may be advantageously accomplished by shifting each set of six phases by 15 electrical degrees in opposite directions relative to the phase angles of the incoming power source.

Other alternative embodiments of the invention which may be particularly useful in smaller power systems, or in retrofitting existing power systems, include systems which may have one, two or three input phases, and two, four, or six output phases, respectively. Illustrative embodiments of these systems may incorporate an autotransformer which is serially connected to an input phase to generate a second output circuit having a phase angle which has been shifted by 180 electrical degrees relative to the input circuit. This shifted circuit, when sharing a neutral with a circuit having the original phase, would offer the current cancellation advantage discussed above.

Still other alternative embodiments of the power distribution system of the present invention may be particularly useful in power systems where the electrical loads, including non-linear loads, are remotely located from one another. These systems include one or more transforming devices each having two or three input phases supplied to a primary side of the transforming device by an input source of three-phase power, two, four, or six output phases provided at a secondary side of the transforming device, and a shared neutral conductor provided at the secondary side of the transforming device for each group of two output phases.

Each group of two output phases includes a first output phase and a second output phase. The first and second output phases are separated from one another by approximately 180 electrical degrees. The electrical loads are distributed between the first and second output phases and the shared neutral conductor so as to reduce, by current cancellation, current which would otherwise flow in the shared neutral conductor due to the presence of the non-linear loads. In addition, each first output phase is shifted from one of the phases of the input source by approximately 15 electrical degrees and each second output phase is shifted from that same phase of the input source by approximately 195 electrical degrees. This shifting helps reduce the level of instantaneous power drawn from the input source which would otherwise occur due to the presence of the non-linear loads. To the extent that there are 12 electrical loads, or electrical loads in multiples of 12, maximum reduction in the level of instantaneous power drawn from the input source is achieved through the use of a power distribution system having six two-output phase transforming devices, three four-output phase transforming devices, two six-output phase transforming devices, or any combination of these such as two two-output phase transforming devices and two four-output phase transforming devices. An advantage of these other alternative embodiments of the power distribution system of the present invention is that this maximum reduction in the level of instantaneous power drawn from the input source can be achieved with electrical loads at various remote locations. That is, all of the electrical loads do not have to be located in the same immediate area in order to achieve this reduction.

Other objects, advantages and novel features of the present invention will become apparent from the following detailed description of the invention when considered in conjunction with the accompanying drawings.

BRIEF DESCRIPTION OF THE DRAWINGS

FIG. 1 shows a switched power supply circuit of the type commonly used in devices such as personal computers.

FIGS. 2(a) and 2(b) show the waveforms of the input line voltage and line current associated with power supply circuit 10 of FIG. 1.

FIG. 4a graphically illustrates the line voltages present on each of phases L1, L2 and L3 in the circuits of FIG. 3.

FIG. 4b graphically illustrates the current waveform for each phase of the circuits shown in FIG. 3 when a power supply circuit for the type shown in FIG. 1 is connected between each phase and the shared neutral.

FIG. 4c graphically illustrates the magnitude of the current flowing on the shared neutral conductor as a result of the currents illustrated in FIG. 4b.

DETAILED DESCRIPTION OF THE DRAWINGS

FIG. 1 shows a switched power supply circuit 10 of the type commonly used in personal computers. In power supply circuit 10 of FIG. 1, line voltage is rectified by a bridge rectifier 12 at the input of circuit 10. The resulting DC power charges capacitor C. A chopping circuit 14 is used to convert the resulting DC power back to AC power for subsequent transformation and regulation as required by the particular device incorporating the power supply.

FIGS. 2(a) and 2(b) show the waveforms of the input line voltage and line current associated with power supply circuit 10 of FIG. 1. Since the diodes in bridge circuit 12 conduct only when the forward biasing voltage exceeds the voltage across capacitor C, line current flows into power supply circuit 10 in accordance with the waveform shown in FIG. 2(b). As shown, the line current drawn by power supply circuit 10 consists of a series of positive and negative peaks which are aligned with the positive and negative peaks of the line voltage, and which are separated by relatively long periods during which no line current flows. The "dwell" or conduction angle of each peak is typically 40–50 electrical degrees, but will vary in accordance with the demand for power at the output of power supply circuit 10.

Figure 3:
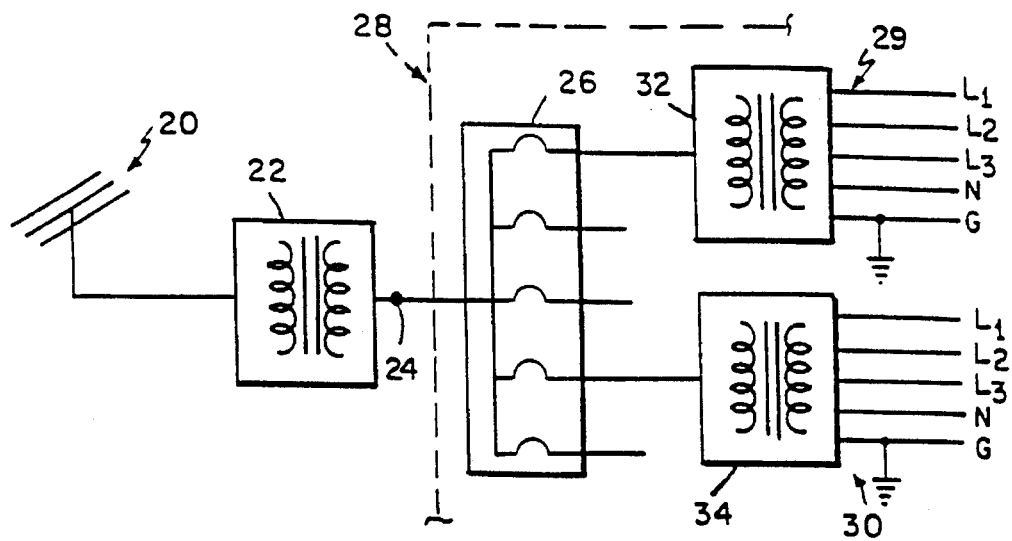
FIG. 3 shows a schematic wiring diagram of a prior art office power distribution system.

FIG. 3 shows a schematic wiring diagram of a power distribution system for office power systems commonly used in the prior art. In the arrangement shown in FIG. 3, three-phase power is supplied from utility lines 20 at a relatively high voltage to the primary of a transforming device 22. The secondary of transforming device 22 provides three-phase power, typically at 480 volts, via conductors 24 to a service entrance or panel 26 of a customer. In this instance, service panel 26 may be located in an office building 28, schematically represented by dashed lines in FIG. 3. Connected to the output side of panel 26 are a plurality of distribution circuits represented generally by circuits 29 and 30. Circuits 29 and 30 typically include three-phase transforming devices 32 and 34, respectively. Electrical power is provided to the primary sides of transforming devices 32 and 34 from panel 26 at 480 volts (line to line) and is stepped down to voltage levels of 208 volts (line to line) and 120 volts (line to neutral). The secondary or output sides of transforming devices 32 and 34 are connected to a variety of loads, including lighting loads, computers and convenience outlets. Loads are typically connected between one of the three line conductors L1, L2 and L3, and a shared neutral conductor N. A separate ground conductor is also provided. Voltages on lines L1, L2 and L3 are 120 electrical degrees out of phase. When resistive loads are connected between each phase conductor and the shared neutral in a balanced manner, no current flows in the shared neutral due to current cancellation effects resulting from the relative phase relationships existing between the voltages on line conductors L1, L2 and L3.

FIG. 4(a) graphically illustrates the line voltages present on each of phases L1, L2 and L3 in the circuits of FIG. 3. As illustrated, each phase is separated from, or shifted relative to, the other two phases by 120 electrical degrees. FIG. 4(b) graphically illustrates the current waveform for each phase when a power supply circuit of the type illustrated in FIG. 1 is connected between each phase conductor and the shared neutral conductor N. As discussed in connection with FIGS. 1 and 2 above, line current flows in each phase for only a portion of each half cycle due to the design of the power supply circuit.

FIG. 4 (c) graphically illustrates the magnitude of the current flowing on the shared neutral conductor N as a result of the currents illustrated in FIG. 4 (b). As is apparent from FIG. 4 (c), all of the current flow is present in the shared neutral conductor, notwithstanding the fact that equal loads are connected between each phase and the neutral (i.e., the loads are balanced). Due to the "pulsed" nature of the current flow occurring in each phase, current cancellation effects which might otherwise reduce or eliminate current flowing in the shared neutral conductor do not reduce or eliminate current in the neutral in this instance. As long as the conduction angles of the pulses illustrated in FIG. 4 (b) are 60° or less, current cancellation will not occur in the neutral conductor since there is no "overlapping" of currents from the individual phases.

Figure 5:
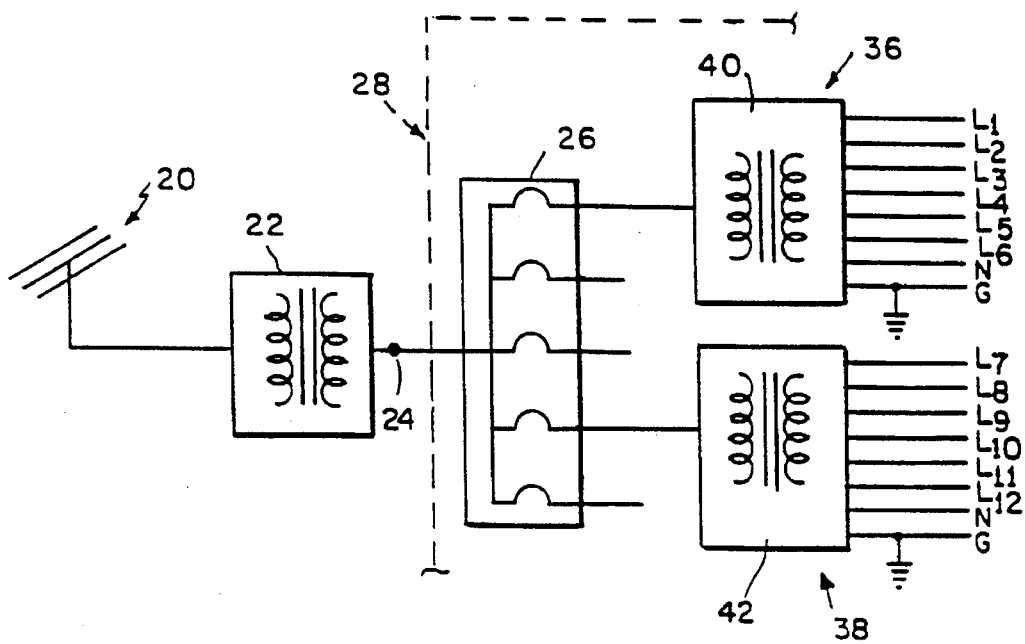
FIG. 5 shows a schematic wiring diagram of a power distribution system of the present invention.
Figure 6:
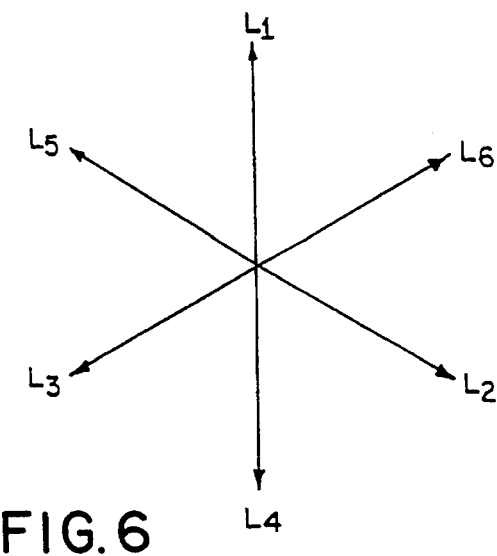
FIG. 6 is a vector phase diagram which illustrates the phase separation existing between phases L1–L6 of FIG. 5.

FIG. 5 shows an electrical power distribution system in which the problem of excessive neutral conductor currents of the type illustrated in FIG. 4 (c) is addressed. Elements 20–28 of FIG. 5 are essentially identical to corresponding elements of FIG. 3 and, thus, have been numbered accordingly. Circuits 36 and 38 differ, however, from circuits 29 and 30. Specifically, circuits 36 and 38 include transforming devices 40 and 42 which transform the three-phase, 480 volt input power to a six-phase, 208 volt (line-to-line) output to provide six phases (L1, L2, L3, L4, L5 and L6 in circuit 36 and L7, L8, L9, L10, L11 and L12 in circuit 38), each of which is separated by 60 electrical degrees from the others. FIG. 6 is a vector phase diagram which illustrates the phase separation existing between phases L1–L6. As illustrated in FIG. 6, phases L1, L2 and L3 are separated by 180 electrical degrees from phases L4, L5 and L6, respectively.

Figure 7:
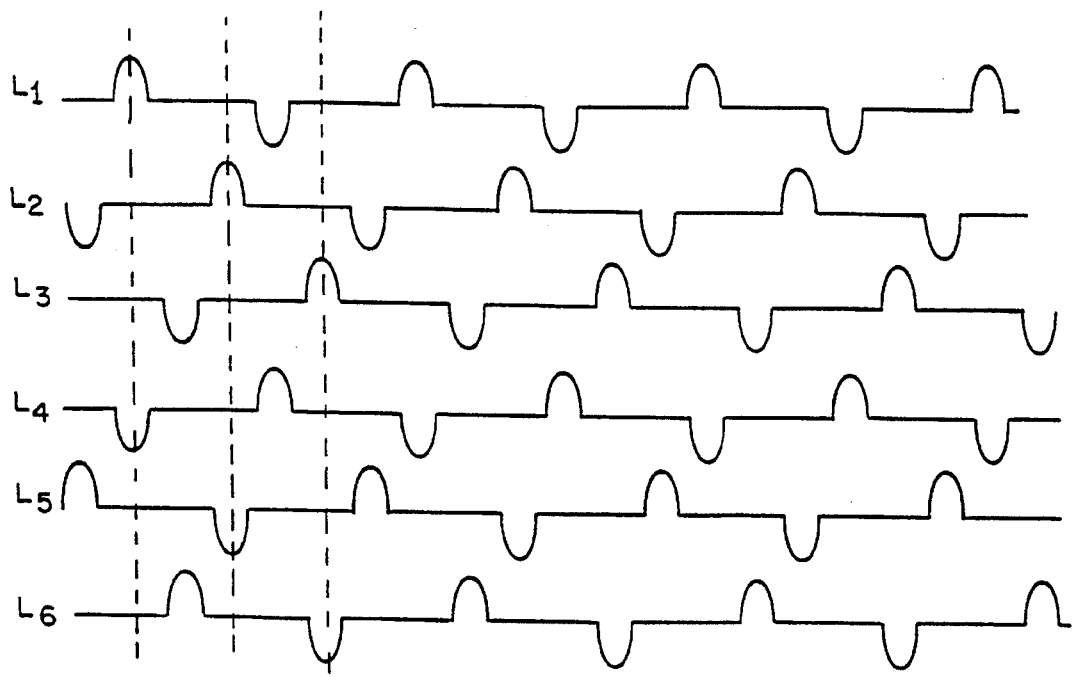
FIG. 7 graphically illustrates the current waveform for each of phases L1–L6 of FIG. 5 when a power supply circuit of the type illustrated in FIG. 1 is connected between each phase and a shared neutral conductor.

FIG. 7 illustrates the current flowing in each of phases L1–L6 when a power supply circuit of the type illustrated in FIG. 1 is connected between each of these phase conductors and the shared neutral conductor N. As illustrated in FIG. 7, each of the current peaks caused by current flow in phases L1, L2 and L3 is offset by an equal and opposite current flowing in phases L4, L5 and L6. Thus, the net current flow in the shared neutral conductor N as a result of the loads illustrated in FIG. 7 is zero. In other words, "pulsed" currents of the type illustrated in FIG. 2(b) flowing in the shared neutral conductor as a result of the loads connected between phases L1, L2 and L3 and the shared neutral are offset or cancelled by equal and opposite currents flowing in the shared neutral due to similar loads connected between phases L4, L5 and L6 and the shared neutral. To the extent the loads on phases separated by 180 electrical degrees are identical, all currents, including the fundamental and all harmonics, cancel. The currents illustrated in FIG. 7 are, of course, idealized. In practical applications, "perfect" balance between opposing phases will rarely be achieved and is not necessary to provide the benefit of substantial reductions of current which might otherwise flow in the neutral conductor due to the presence of pulsed, non-linear loads in the system. References to "balanced" loads or "balancing" of loads in this application are not to be taken as requiring that precisely the same number of loads be connected between each phase and the shared neutral conductor.

Figure 8:
FIG. 8 graphically illustrates variations in the level of power drawn by the loads connected between phases L1–L6 of FIG. 5.

The six-phase arrangement described above may be used to effectively reduce or eliminate excess neutral currents flowing in the neutral conductor on the load side of transforming devices 40 and 42 of circuits 36 and 38, respectively. Illustrated in FIG. 8, however, is a separate problem which still exists on the generator side of transforming devices 40 and 42. FIG. 8 shows a graphical representation of the instantaneous power demanded by circuits 36 and 38 operating with the loads illustrated in FIG. 7. Unlike the neutral currents on the load side of devices 40 and 42, the instantaneous power demanded by each load connected between phases L1–L6 and the shared neutral N does not cancel, but is additive to produce the "pulsed" power demand illustrated in FIG. 8. This type of power demand is more difficult for an electric utility to satisfy than is an essentially constant, steady demand. Indeed, in some locations, utility customers connecting such loads to the utility system will be penalized in the form of higher rates or other assessments.

Figure 9:
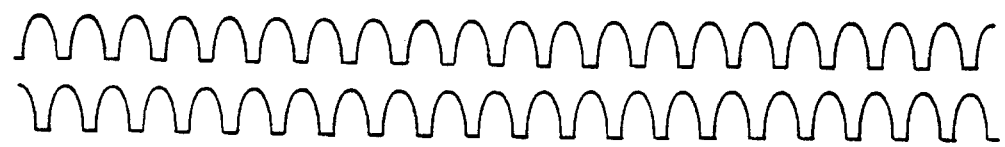
FIG. 9 graphically illustrates the variations in the level of power drawn by the loads connected between phases L1–L6 and the shared neutral of FIG. 5, and by an identical set of loads identically connected between phases L7–L12 of FIG. 5.
Figure 10:
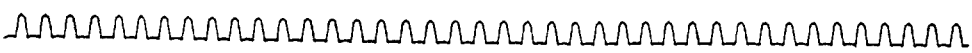
FIG. 10 shows a summation of the waveforms illustrated in FIG. 8.

The condition illustrated in FIG. 8 can be addressed, and substantially improved, by shifting the respective phases of circuits 36 and 38 relative to one another. In other words, phases L7–L12 of circuit 38 can be shifted relative to the respective phases L1–L6 of circuit 36 to smooth the overall demand for power, as viewed from the generator side of transforming devices 40 and 42. FIG. 9 illustrates the power demanded by circuits 36 and 38, respectively, after each of the phases L7–L12 of circuit 38 are shifted by 30 electrical degrees relative to the corresponding phases L1–L6 of circuit 36. FIG. 10 illustrates the sum of the two waveforms shown in FIG. 9, and thus illustrates the power demand as seen by the utility system on the generator side of transforming devices 40 and 42. As is readily apparent, the power demand illustrated in FIG. 10 is much more constant and steady than that illustrated in FIG. 8 (the difference between the peak value and the average value of the waveform of FIG. 10 is approximately 8%). This appears much more like a resistive load to the generator. In addition to easing other problems on the generator side of the transformer, this smoothing of the power demand tends to correct the large calibration shifts which occur in inductive watt-hour meters due to the presence of the pulsed, non-linear load currents.

As noted, FIG. 9 illustrates the power demanded by circuits 36 and 38, respectively, after each of the phases of circuit 38 are shifted by 30 electrical degrees relative to the corresponding phases of circuit 36. There are several ways in which this relative phase shift can be accomplished. However, it may be advantageous to achieve this relative separation by shifting phases L1–L6 of circuit 36 by 15 electrical degrees in one direction (relative to, for instance, the incoming phases), and shifting phases L7–L12 of circuit 38 by 15 degrees in the opposite direction. This arrangement may result in additional "smoothing" of the instantaneous power demanded from the generator due to the likely presence of other loads which are "in-phase" with the incoming power source.

Although the arrangement in FIG. 5 utilizes two transforming devices (40 and 42), the respective outputs of which are phase shifted to reduce the relative magnitudes of the power "pulses" on the generator side of the transformer, other arrangements may be used to accomplish this result. For example, a single transforming device having a twelve-phase output may also be used. Further, "smoothing" of the instantaneous power demanded from the generator can be accomplished in a system having fewer phases, and in which neutral current cancellation on the load side does not occur. For example, a system having a three-phase input and a three phase output in which each of the output phases is shifted, for example, by 30 electrical degrees relative to each of the respective input phases will smooth the power demanded from the generator by pulsed, non-linear loads. This arrangement will provide benefits to the utility company (or other power provider), even in the absence of the current cancellation benefits on the load side discussed above.

Figure 11:
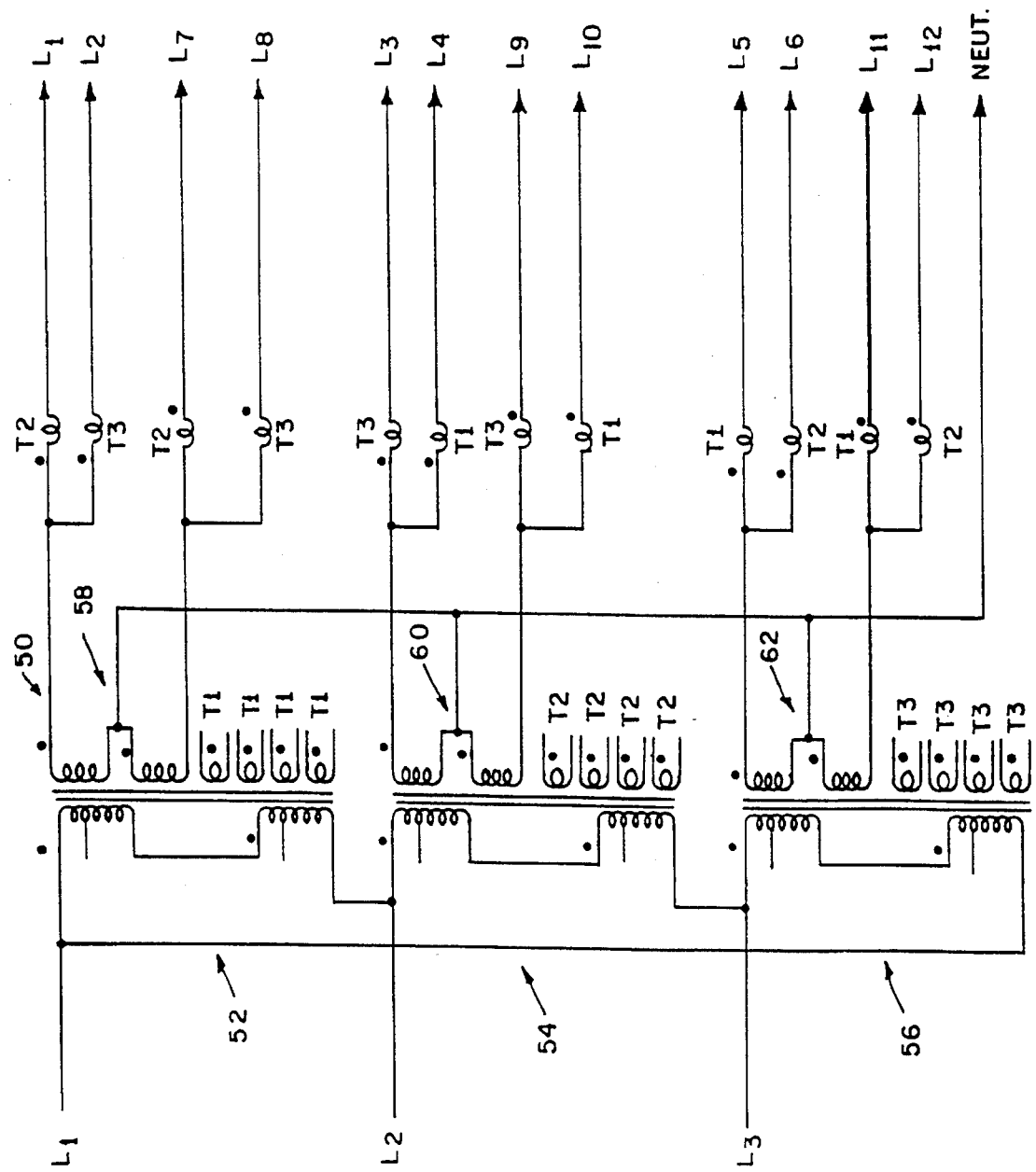
FIG. 11 schematically illustrates a transforming device constructed in accordance with the principles of the present invention.

FIG. 11 schematically illustrates a transforming device 50 which can be used in accordance with the present invention. Device 50 has a delta-connected primary which provides power to three primary windings 52, 54 and 56. The respective secondaries associated with each of the primary windings comprise main secondary windings 58, 60 and 62, and a plurality of smaller windings labeled T1, T2 and T3, respectively. These smaller windings are connected in series with one or the other of each side of secondary windings 58, 60 and 62, as illustrated, to provide a 12-phase output in which, for example, phases L1–L6 are separated from each other by 60 electrical degrees, phases L7–L12 are separated from each other by 60 electrical degrees, and phases L1–L6 are each shifted 15 electrical degrees in one direction (relative to the input power source) and phases L7–L12 are each shifted 15 electrical degrees in the other direction.

Using a device such as that illustrated in FIG. 11, loads can be distributed between phases L1–L6 and L7–L12 so as to effectively eliminate, or reduce, current on the shared neutral conductor N on the load side of the transformer. Phases L1–L6 can further be shifted, relative to respective phases L7–L12, to reduce the instantaneous magnitude of the power demands on the generator side of the transformer. In "ideal" circumstances, loads will be evenly distributed between each of the phases and neutral to achieve maximum reduction of current in the neutral conductor, and the two groups of six-phases will be uniformly shifted to smooth the instantaneous power demanded from the generator to the greatest degree. However, under more realistic conditions, load distributions which are not precisely even, and varying degrees of relative phase shifting, may be most effective in mitigating the problems discussed above. The ability to "tune" the system by periodically re-distributing loads and adjusting relative phase shifts may be desirable and justifiable in particular circumstances. In large installations, additional six-phase and/or twelve-phase circuits, utilizing varying degrees of phase shifting, may further reduce the negative effects caused by large concentrations of loads such as that shown in FIG. 1.

Figure 12:
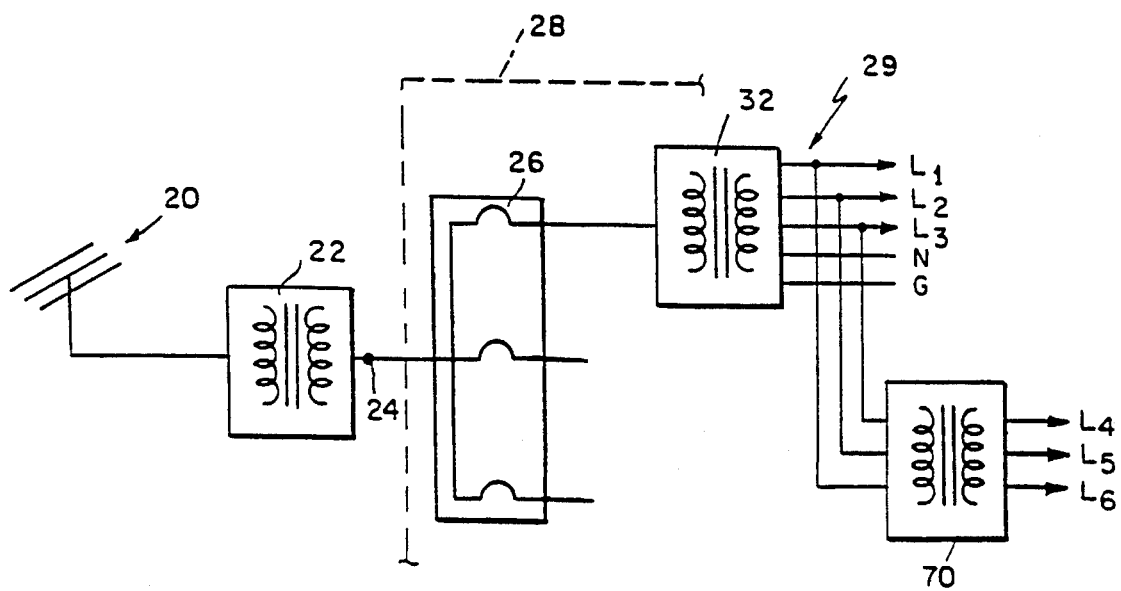
FIG. 12 shows a schematic wiring diagram of an alternative embodiment of a power distribution system constructed in accordance with the principles of the present invention.

FIG. 12 shows a schematic wiring diagram of an alternative embodiment of the present invention which may be particularly advantageous in smaller power systems and/or in retrofitting existing installations. The system illustrated in FIG. 12 is similar in many respects to the prior art system illustrated in FIG. 3 and like reference numerals are used to indicate like elements, accordingly. However, in the circuit of FIG. 12, an additional element, in the form of transforming device 70 has been added. The primary side of transforming device 70 is connected to the three-phase output of device 32. The three-phase secondary output of device 70 (i.e., phases L4, L5 and L6) may be shifted by 180 electrical degrees, relative to phases L1, L2 and L3, respectively, to reduce or eliminate current flow in the shared neutral conductor resulting from connection of a plurality of pulsed, non-linear loads between the respective phases and the neutral. Alternatively, each of phases L4, L5 and L6 may be shifted by 30 electrical degrees, for instance, to smooth the demand for power on the generator side of device 32. Device 32 may also be wound to shift phases L1, L2 and L3 relative to the phases of the input power source by, for instance, 15 electrical degrees in the direction opposite the 30 degree shift effected by device 70.

Figure 13:
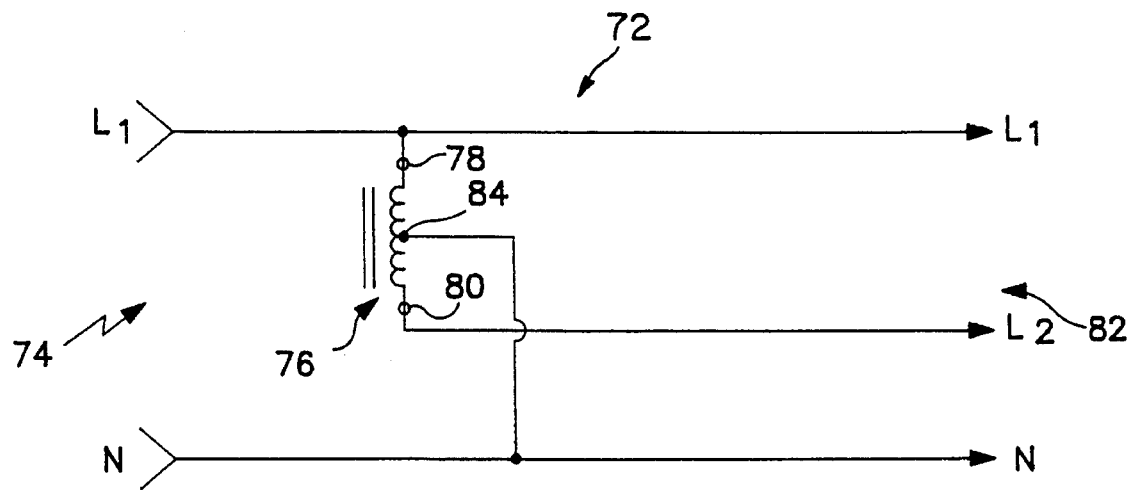
FIG. 13 shows a schematic wiring diagram of another alternative embodiment of a power distribution system constructed in accordance with the principles of the present invention.
Figure 14:
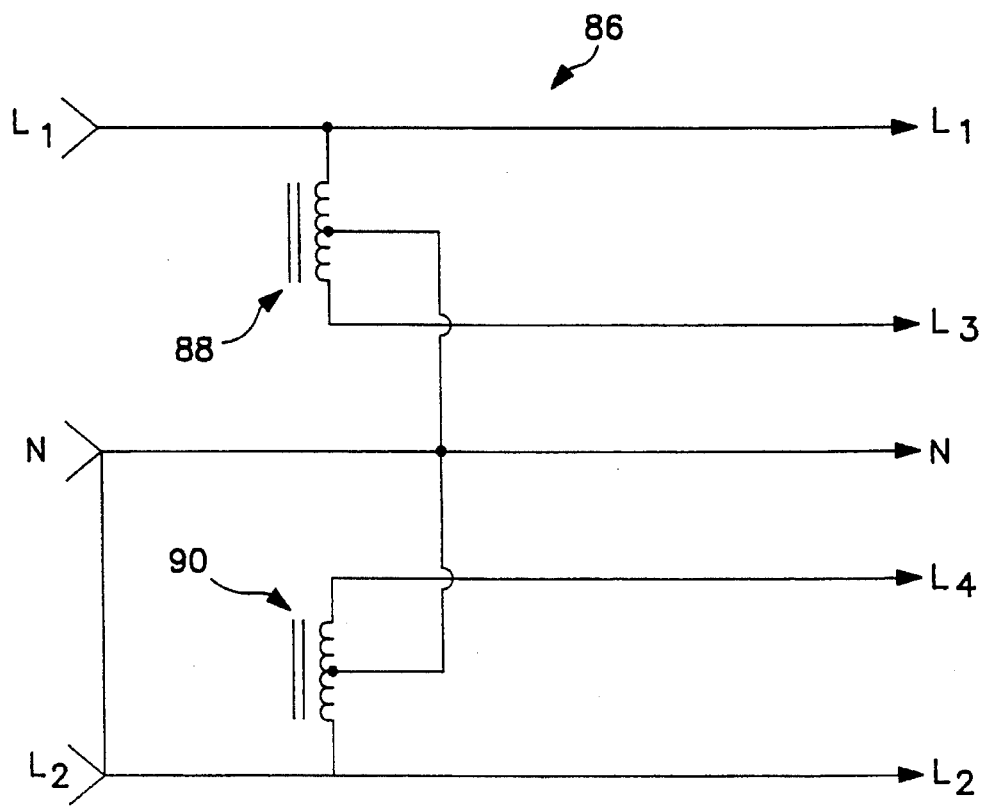
FIG. 14 shows a schematic wiring diagram of yet another alternative embodiment of a power distribution system constructed in accordance with the principles of the present invention.

FIGS. 13 and 14 show schematic wiring diagrams of additional alternative embodiments of the present invention which, like the arrangement of FIG. 12, may be particularly advantageous in smaller power systems and/or in retrofitting existing installations. These systems also illustrate the manner in which an autotransformer may be used in the invention. FIG. 13 shows an arrangement 72 which includes an input 74 having a single line conductor L1 and a neutral conductor N. An autotransformer 76 is connected on a first end 78 to input conductor L1. The other end 80 of autotransformer 76 is connected to an output conductor designated L2. Thus, the output 82 of arrangement 72 comprises conductors (or phases) L1 and L2, and the neutral conductor N. Neutral conductor N is also connected to a center tap 84 of autotransformer 76.

In the arrangement illustrated in FIG. 13, two output circuits are provided: L1-N and L2-N. The phase of the L2-N circuit is shifted by 180 electrical degrees relative to circuit L1-N. Accordingly, if non-linear loads are evenly distributed between these two circuits, the desired cancellation of neutral currents on shared neutral conductor N will occur.

FIG. 14 shows a similar arrangement 86 in which two input phases L1 and L2 are similarly connected to respective autotransformers 88 and 90. The resulting output circuits are L1-N, L2-N, L3-N and L4-N. The phases of circuits L3-N and L4-N are shifted by 180 electrical degrees, respectively, relative to circuits L1-N and L2-N. It should be readily apparent that, if input phases L1 and L2 are two phases of a three-phase system, additional and substantially identical arrangements can be provided for the remaining combinations of the input phases (i.e., L1–L3 and L2–L3) to provide three sets of output circuits, each set having four circuits as illustrated in FIG. 14. In such an arrangement, the relative phase angles of each of the circuits in a set can vary, relative to the phase angles of corresponding circuits in the other sets, to achieve reductions in the instantaneous level of power demanded from any one input phase, as has been previously discussed.

Although FIGS. 13 and 14 illustrate alternative embodiments of the invention, the broad concepts embodied in arrangements 72 and 86 are the same as those embodied in the embodiment, for example, of FIG. 12.

Figure 15:
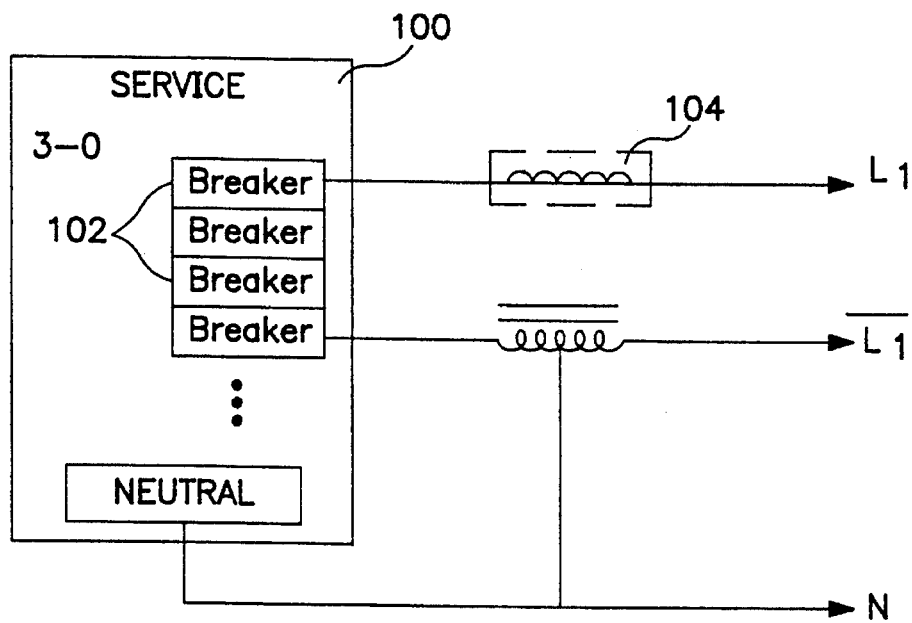
FIG. 15 shows a schematic wiring diagram of an alternative embodiment of a power distribution system similar to the system shown in FIG. 13.

FIG. 15 shows an alternative embodiment of the invention which is similar to the circuit shows in FIG. 13. In FIG. 15, a three-phase circuit breaker box 100 is shown to contain a plurality of circuit breakers 102. Each of breakers 102 is connected at its input and to one of three phases provided from a three-phase service entrance (not shown). The output side of two of the circuit breakers 102 are connected, as illustrated in FIG. 15, to a first output phase which is identified as phase L1. The output of a second breaker 102 is connected to an autotransformer (similar to autotransformer 76 of FIG. 13) to shift the phase of the circuit by 180° relative to circuit L1. Accordingly, this output is identified as L2. These circuits share a neutral conductor N in the same manner as discussed above in connection with FIG. 13. In this arrangement, each of the circuits L1 and L2 can provide current up to the full rating of each of the individual circuit breakers 102. This is in contrast to the arrangement of FIG. 13 in which the output of circuits L1 and L2 must be shared through a common circuit breaker having an output connected to phase L1.

Also shown in FIG. 15 is optional coil 104 which may be necessary or desirable for connection in series with phase L1 to assure that the respective impedances of phases L1 and L2 remain substantially equal. Again, this is an optional feature which may be necessary in certain situations and under certain conditions, but unnecessary in others.

Figure 16:
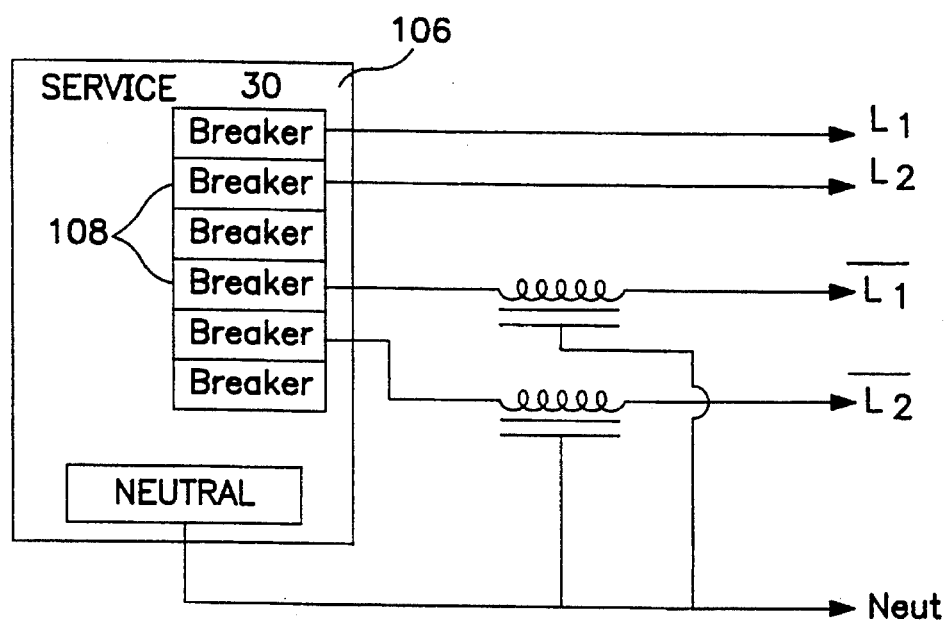
FIG. 16 shows a schematic wiring diagram of an alternative embodiment of a power distribution system similar to the system shown in FIG. 14.

FIG. 16 shows a similar arrangement which includes a breaker box 106 having a plurality of circuit breakers 108 which have outputs ends connected to four phases (L1 and L2, L3 and L4), as illustrated. This arrangement is similar to the arrrangement shown in FIG. 14, except that current can be drawn through each of the phases shown in FIG. 16 up to the maximum current ratings of each of the breakers 108. If necessary, coils similar to coil 104 of FIG. 15 may be provided in series with phases L1 and L2.

Other alternative embodiments of the power distribution system of the present invention are particularly useful in power systems where the electrical loads, including non-linear loads, are remotely located from one another.

Figure 17:
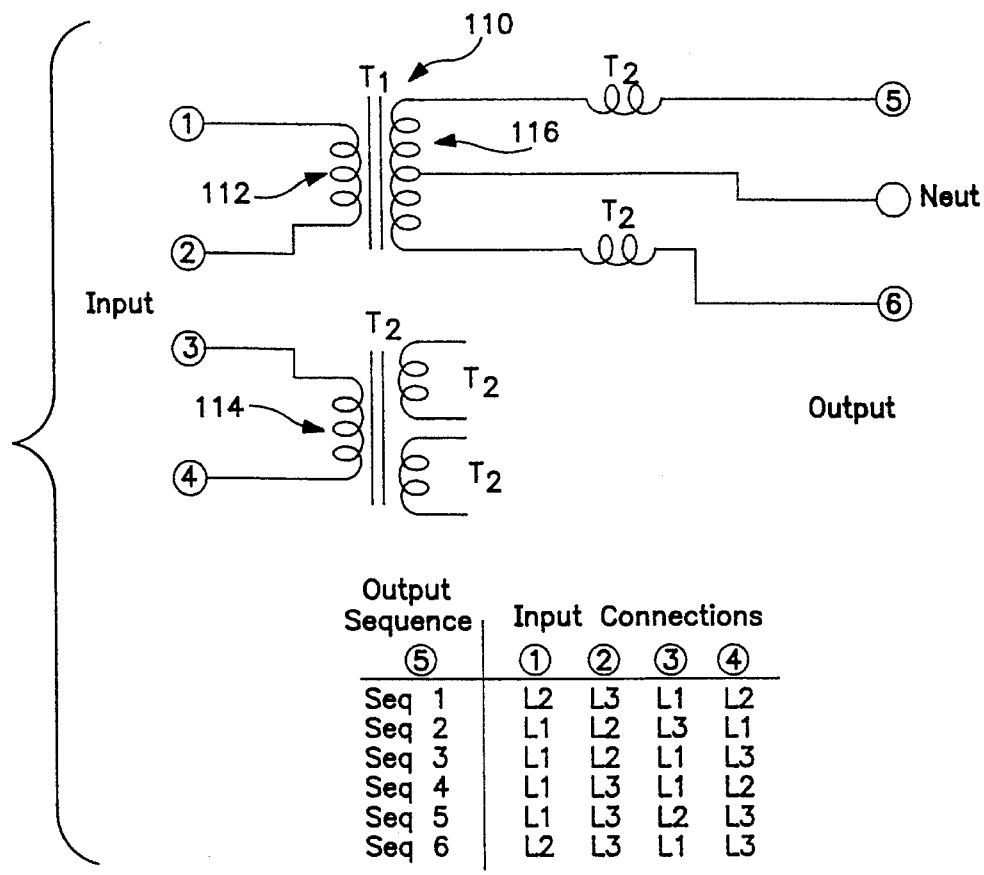
FIG. 17 is a schematic wiring diagram of an embodiment of a two-output phase transforming device of the present invention and input connections for six transforming devices that can be used to generate six output phase sequences shown in FIG. 18.

FIG. 17 is a schematic wiring diagram of a two-output phase, transforming device 110 that can be used as a part of such a distribution system for remotely located electrical loads. Device 110 includes a major primary winding 112 and a millor primary winding 114. Major and minor primary windings 112 and 114 are electrically connected to a source of three-phase power, discussed above, through conductors labeled with circled numerals 1–4 in FIG. 17. In a preferred embodiment, major primary winding 112 handles approximately 2.73 times more power than minor primary winding 114. Device 110 also includes a major secondary winding 116 associated with major primary winding 112. A pair of conductors, labeled with circled numerals 5 and 6 in FIG. 17, are electrically connected to major secondary winding 116. A center tap of major secondary winding 116 is connected to the electrical neutral conductor, as indicated by the letters NEUT. in FIG. 17. This becomes a shared neutral for circuits utilizing the conductors indicated by circled numerals 5 and 6 as discussed above in connection with FIGS. 1–16. In preferred embodiments, the neutral conductor is also the grounded conductor. A first output phase of device 110 is present on conductor 5 and a second output of device 110 is present on conductor 6. The first and second output phases of device 110 are separated from one another by 180 electrical degrees (i.e., the first and second output phases are in antiphase). Electrical loads are distributed between the first and second output phases and shared neutral conductor NEUT. so as to reduce, by current cancellation, current which would otherwise flow in shared neutral conductor NEUT. due to the presence of the non-linear loads. It should be noted that this circuit also cancels the current from all loads.

Device 110 further includes a pair of minor secondary windings, labelled as $T_2$ in FIG. 17, that are associated with minor primary winding 114. One of each of minor secondary windings $T_2$ are electrically connected in series with conductors 5 and 6 as shown in FIG. 17. Minor secondary windings $T_2$, in combination with major winding 116, produce a predetermined phase shift between the input source of three-phase power and the output of device 110. Shifting the output phases of transforming device 110 relative to the phases of the input source helps reduce the level of instantaneous power drawn from the input source which otherwise occurs due to the presence of the non-linear loads. In preferred embodiments, the first output phase is shifted approximately 15 electrical degrees from that same phase of the input source.

For device 110, an electrical load is divided into twelve groups. Maximum reduction of the level of instantaneous power drawn from the input source is achieved through the use of a power distribution system having six two-output phase transforming devices 110. Input conductors 1–4 of each device 110 are electrically connected, in various combinations, to the three phases of the input source as indicated in the chart in FIG. 17. Each of these various combinations of connections produces a different phase shift in time for each of the six pairs. These phase shifts are indicated in the chart shown in FIG. 17 by output phase sequences SEQ. 1–SEQ. 6.

Figure 18:
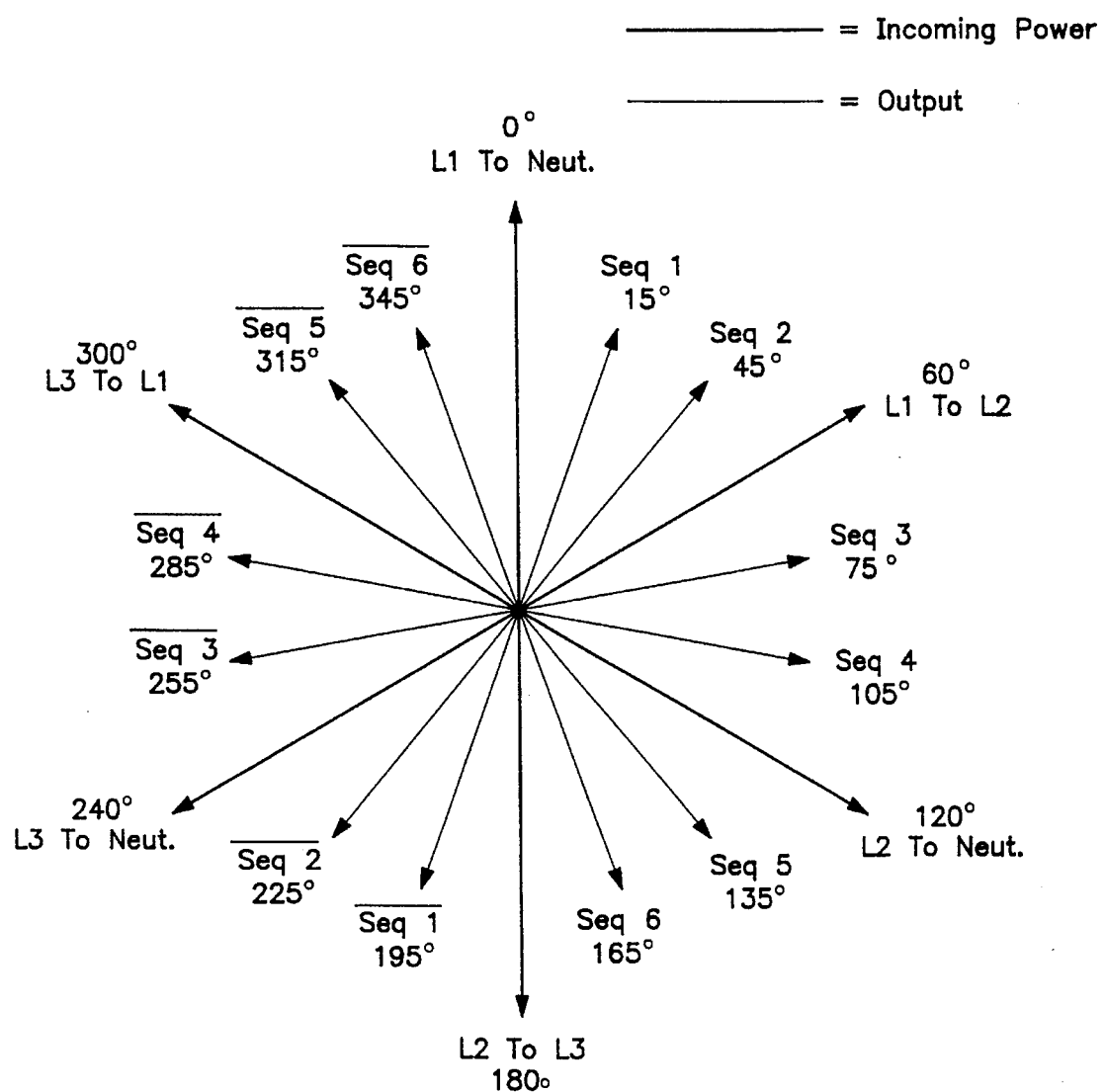
FIG. 18 is a vector phase diagram which illustrates the shifted output phase sequences of the transforming devices of the power distribution system of the present invention that are used to achieve maximum reduction in the level of instantaneous power drawn from an input source which supplies power to the distribution system.

A vector phase diagram illustrating the phase angle separation between output phase sequences SEQ. 1–SEQ. 6 and the three phases of the input source is shown in FIG. 18. Both Delta connection and Wye connection vectors are shown. As can be seen in FIG. 18, for example, output phase sequence SEQ. 1, which appears on conductor 5 for one of the input conductor combinations for device 110 shown in FIG. 17, is shifted from input source phase L1 by approximately 15 electrical degrees. As can also be further seen in FIG. 18, output phase sequence $\overline{\text{SEQ. 1}}$, which appears on conductor 6 for the same input conductor combination, is shifted from the input source phase $L_1$, by approximately 195 electrical degrees.

Figure 19:
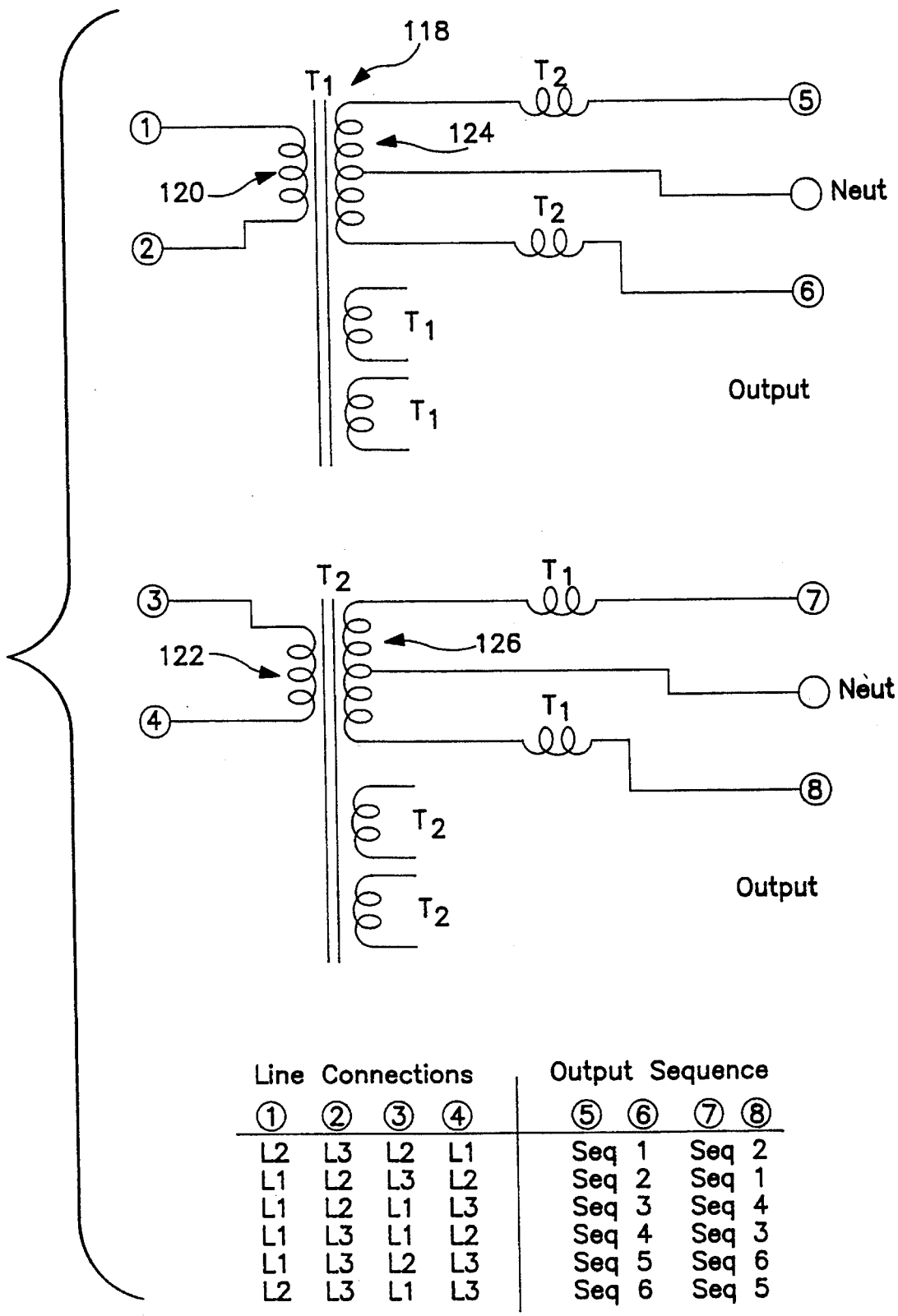
FIG. 19 is a schematic wiring diagram of a four-output phase transforming device of the present invention and six possible input connections for the four-output transforming device which will yield various output phase sequences shown in FIG. 18.

FIG. 19 is a schematic wiring diagram of a four-output phase transforming device 118 that can be used for remotely located electrical loads. Device 118 includes first and second primary windings 120 and 122. First and second primary windings 120 and 122 are electrically connected to a source of three-phase power, discussed above, though conductors labeled with circled numerals 1–4 in FIG. 19. Device 118 also includes first and second secondary windings 124 and 126. A pair of conductors, labeled with circled numerals 5 and 6 in FIG. 19, are electrically connected to first secondary winding 124 and a pair of conductors, labeled with circled numerals 7 and 8 in FIG. 19, are electrically connected to second secondary winding 126. Center taps of first and second secondary windings 124 and 126 become shared neutral conductors, as indicated by the letters NEUT and discussed above. In preferred embodiments, these neutral conductors are also the grounded conductors. First output phases of device 118 are present on conductors 5 and 7 and second output phases of device 118 are present on conductors 6 and 8. The first and second output phases of device 118 are separated from one another by approximately 180 electrical degrees (i.e., the first and second output phases are in antiphase). As discussed above, electrical loads are distributed between these first and second output phases and the shared neutral conductors NEUT. so as to reduce, by current cancellation, current which otherwise would flow on shared neutral conductors NEUT. due to the presence of these non-linear loads. It should be noted that this circuit cancels current from all load types.

Device 118 further includes a first pair of minor secondary windings, labeled as $T_1$ in FIG. 19, that are associated with first primary winding 120. Device 118 also further includes a second pair of minor secondary windings, labeled as $T_2$ in FIG. 19, that are associated with second primary winding 122. One of each of minor secondary windings $T_1$ are electrically connected in series with conductors 7 and 8 as shown in FIG. 19 and one of each minor secondary windings $T_2$ are electrically connected in series with conductors 5 and 6 as shown in FIG. 19. Minor secondary windings $T_1$ and $T_2$ produce a predetermined number of electrical degrees of phase shift between the first and second output phases of device 118 and the first phase of the input source. As discussed above, shifting the output phases of a transforming device relative to the input phases helps reduce the level of instantaneous power drawn from the input source which would otherwise occur due to the presence of the non-linear loads. In preferred embodiments, the first output phases on conductors 5 and 7 are each shifted by approximately 15 electrical degrees from one of the three phases of the input source and the second output phases on conductors 6 and 8 are each shifted by approximately 195 electrical degrees from that same input source phase.

For device 118, an electrical load becomes divided into twelve sets. Maximum reduction in the level of instantaneous power drawn from the input source is achieved through the use of a power distribution system that utilizes three four-output phase transforming devices 118. Input conductors 1–4 of each device 118 are electrically connected in various combinations, to the three phases of the input source as indicated in the chart shown in FIG. 19. Each of these various combinations produces a different phase shift in time for the first and second output phases of each device 118, as also indicated in the chart by output phase sequences SEQ. 1–SEQ. 6. As discussed above, the phase angle separation between output sequences SEQ. 1–SEQ. 6 is shown in the vector phase diagram of FIG. 18.

In addition to a system incorporating three, four-output phase transforming devices 118, significant reduction in the level of instantaneous power demanded from the input source is achieved through the use of a single four-output phase transforming device 118 that generates two particular output phase sequences. Preferred single four-output phase sequences include sequences SEQ. 3 and 2, sequences SEQ. 1 and 6, and sequences SEQ. 3 and 6. Each of these preferred sequences is a pair in antiphase.

Figure 20:
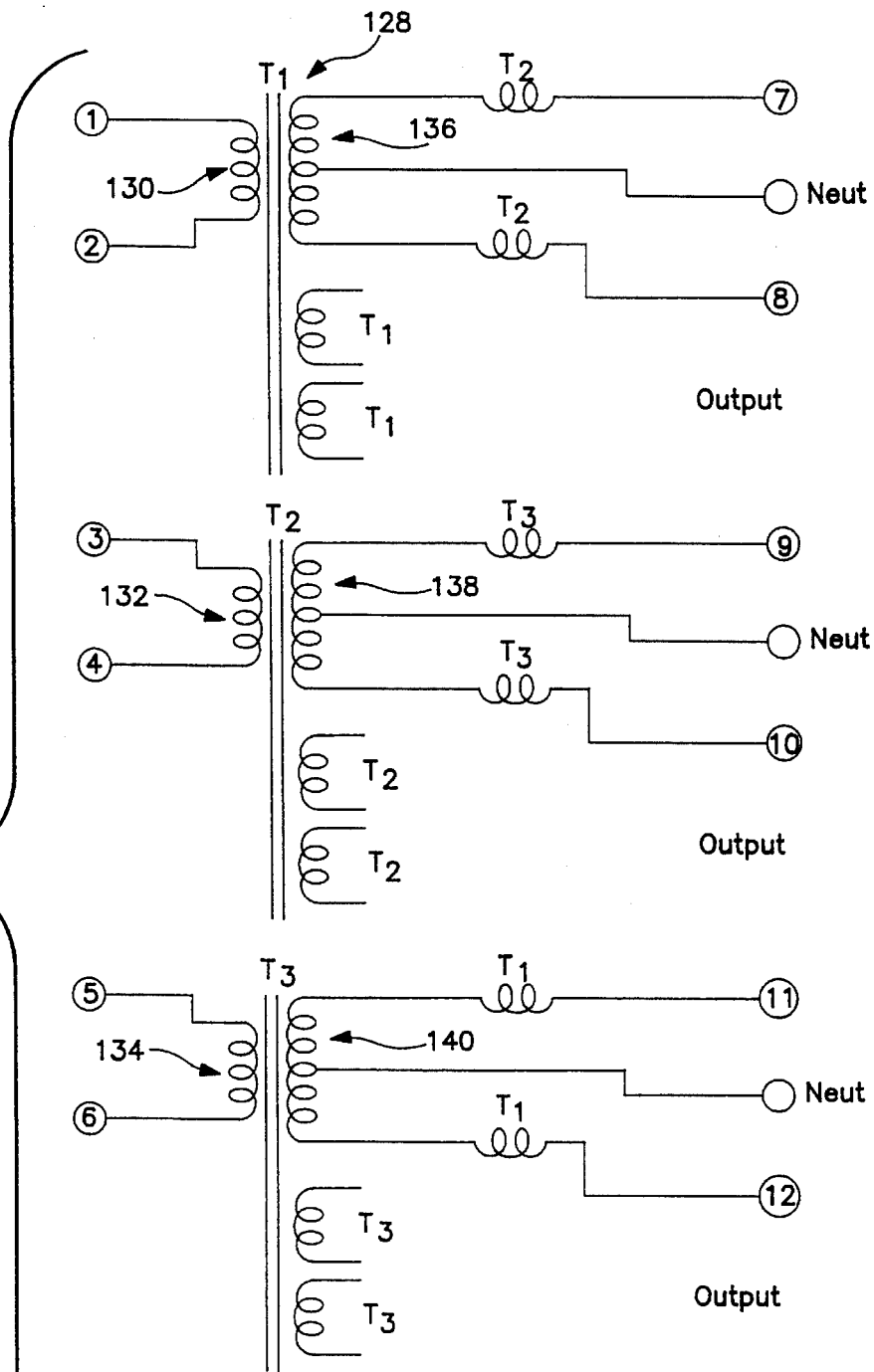
FIG. 20 is a schematic wiring diagram of a six-output phase transforming device of the present invention and six possible input connections for the six-output transforming device which will yield various output phase sequences shown in FIG. 18.

FIG. 20 is a schematic wiring diagram of a six-output phase transforming device 128 that can also be used for remotely located electrical loads. Device 128 includes respective first, second, and third primary windings 130, 132, and 134. First, second, and third primary windings 130–134 are electrically connected to a source of three-phase power, discussed above, through conductors labeled with circled numerals 1–6 in FIG. 20. Device 128 also includes respective first, second, and third secondary windings 136, 138, and 140 which are associated with respective first, second, and third primary windings 130–134. A pair of conductors, labeled with circled numerals 7 and 8 in FIG. 20, are electrically connected to first secondary winding 136, a pair of conductors, labeled with circled numerals 9 and 10 are electrically connected with second secondary windings 138, and a pair of conductors, labeled with circled numerals 11 and 12 in FIG. 20, are electrically connected to third secondary winding 140. Center taps of first, second, and third secondary windings 136–140 become neutral conductors, as indicated by the letters NEUT. in FIG. 20 and discussed above. In preferred embodiments, these neutral conductors are also the grounded conductors. First output phases of device 128 are present on conductors 7, 9, and 11 and second output phases of device 128 are present on conductors 8, 10, and 12. The first and second output phases of device 128 are separated from one another by 180 electrical degrees (i.e., the first and second output phases are in antiphase). As discussed previously, electrical loads are distributed between first and second output phases and the shared neutral conductors NEUT, so as to reduce, by current cancellation, current that otherwise would flow in shared neutral conductors NEUT. due to the presence of these non-linear loads. It should be noted that this circuit cancels current from all load types.

Device 128 further includes a first pair of minor secondary windings, labeled as $T_1$ in FIG. 20, that are associated with first primary winding 130, a second pair of minor secondary windings, labeled as $T_2$ in FIG. 20, that are associated with second primary winding 132, and a third pair of minor secondary windings, labeled as $T_3$ in FIG. 20, that are associated with third primary winding 134. One of each of minor secondary windings $T_1$ are electrically connected in series with conductors 11 and 12 as shown in FIG. 20. In addition, one of each of minor secondary windings $T_2$ are electrically connected in series with conductors 7 and 8 as shown in FIG. 20. Finally, one of each of minor secondary windings $T_3$ are electrically connected in series with conductors 9 and 10 as shown in FIG. 20. Minor secondary windings $T_1$–$T_3$ produce a predetermined number of electrical degrees of phase shift between the first and second output phases and a phase of the input source. As discussed above, shifting the output phases of a transforming device relative to the input phases helps reduce the level of instantaneous power drawn from the input source which otherwise occurs due to the presence of non-linear loads. In preferred embodiments, each of the first output phases are shifted approximately 15 electrical degrees from one of the three phases of the input source and each of the second output phases are shifted by approximately 195 electrical degrees from that same phase of the input source.

For device 128, and electrical load is divided into twelve groups. Maximum reduction in the level of instantaneous power drawn from the input source is achieved through the use of a power distribution system that includes two six-output transforming devices 128. Input conductors 1–6 of each device 128 are electrically connected in various combinations to the three phases of the input source as indicated in the chart shown in FIG. 20. Each of these various combinations produces a different phase shift in time for the first and second output phases of device 128. Such phase shift is also indicated in the chart shown in FIG. 20 by output phase sequences SEQ. 1–6. As discussed above, FIG. 18 illustrates a vector phase diagram for these six different output phase sequences.

An advantage of a system incorporating six two-output phase transforming devices 110, three four-output phase transforming devices 118, or two six-output phase transforming devices 128 is that maximum reduction in the level of instantaneous power drawn from the input source can be achieved with electrical loads at remote locations. That is, all of the electrical loads do not have to be located in the same area in order to achieve this reduction. In addition, a system incorporating a combination of the two-output, four-output, and six-output transforming devices can also be constructed in accordance with the number of loads at various locations serviced by the system. Such a system is able to achieve significant instantaneous power reduction and, thus, significant reduction of the harmonic power in a distribution grid.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. An arrangement for transforming electrical power, comprising:

conductor means for electrically connecting to an input source of three phase electrical power operating at an input source power frequency; and a transforming device electrically connected to the conductor means, the transforming device including means for transforming the input source of three phase electrical power into two output phases separated from one another by approximately 180 electrical degrees, each output phase having an output phase frequency substantially equal to the input source power frequency, and means for reducing the level of instantaneous power drawn from the input source by shifting each output phase a predetermined number of electrical degrees from one of the three phases of the input source at the output phase frequency.

2. The arrangement of claim 1, wherein the transforming means includes a first transformer and the means for reducing the level of instantaneous power drawn from the input source includes a second transformer.

3. The arrangement of claim 2, wherein the second transformer receives power from two phases of the three phase input source one of which is different than two phases of the three phase input source powering the first transformer.

4. The arrangement of claim 1, wherein the predetermined number of electrical degrees is greater than zero electrical degrees and less than 180 electrical degrees.

5. The arrangement of claim 4, wherein the predetermined number of electrical degrees is approximately 30 electrical degrees.

6. The arrangement of claim 1, wherein the input source power frequency is substantially equal to 60 Hertz.

7. An arrangement for transforming electrical power, comprising:

conductor means for electrically connecting the arrangement to an input source of three phase electrical power; and means electrically connected to the conductor means for transforming the input source into first, second, and third sets of two output phases, the output phases of each of the first, second, and third sets being separated from one another by approximately 180 electrical degrees and each shifted from one of the phases of the input source by a predetermined number of electrical degrees, the transforming means comprising:

a first primary winding electrically connected by the conductor means to two of the three phases of the input source;

a second primary winding electrically connected by the conductor means to two of the three phases of the input source;

a third primary winding electrically connected by the conductor means to two of the three phases of the input source;

a first secondary winding associated with the first primary winding and having two output phases separated from one another by approximately 180 electrical degrees;

a second secondary winding associated with the second primary winding and having two output phases separated from one another by approximately 180 electrical degrees;

a third secondary winding associated with the third primary winding and having two output phases separated from one another by approximately 180 electrical degrees;

a first pair of minor secondary windings associated with the first primary winding, one of each of the first pair of minor secondary windings being electrically connected in series with a different one of the two output phases of the second secondary winding to produce a predetermined number of electrical degrees of phase shift between the two output phases of the secondary winding and one of the phases of the input source connected to the second primary winding;

a second pair of minor secondary windings associated with the second primary winding, one of each of the second pair of minor secondary windings being electrically connected in series with a different one of the two output phases of the third secondary winding to produce the predetermined number of electrical degrees of phase shift between the two output phases of the third secondary winding and one of the two phases of the input source connected to the third primary winding; and a third pair of minor secondary windings associated with the third primary winding, one of each of the third pair of minor secondary windings being electrically connected in series with a different one of the two output phases of the first secondary winding to produce the predetermined number of electrical degrees of phase shift between the two output phases of the first secondary winding and one of the two phases of the input source connected to the first primary winding.

8. The arrangement of claim 7, wherein the predetermined number of electrical degrees is approximately 15 electrical degrees for first output phases of each of the first, second, and the secondary windings and approximately 195 electrical degrees for second output phases of each of the first, second, and third secondary windings.

9. The arrangement of claim 8, wherein center taps of the first, second, and third secondary windings are connected to a grounded conductor.

10. An arrangement for transforming electrical power, comprising:

conductor means for electrically connecting the arrangement to an input source of three phase electrical power; and means electrically connected to the conductor means for transforming the input source into first, second, and third sets of two output phases, the output phases of each of the first, second, and third sets being separated from one another by approximately 180 electrical degrees and each shifted from one of the phases of the input source by a predetermined number of electrical degrees;

wherein the predetermined number of electrical degrees is approximately 15 electrical degrees for first output phases of each of the first, second, and third sets and is approximately 195 electrical degrees for second output phases of the first, second, and third sets.

11. An arrangement for transforming electrical power, comprising:

an input source of three phase electrical power; and three sets of two-phase output transformers, each set including first and second two-phase output transformers, a first output phase of each of the first transformers from the three sets leading a different one of the three phases of the input source by approximately 15 electrical degrees, a second output phase of each of the first transformers from the three sets leading a different one of the three phases of the input source by approximately 195 electrical degrees, a first output phase of each of the second transformers from the three sets lagging a different one of the three phases of the input source by approximately 15 electrical degrees, and a second output phase of each of the second transformers from the three sets lagging a different one of the three phases of the input source by approximately 195 electrical degrees.

12. A power distribution system comprising a first set of three transformers, each transformer having means for transforming an input source of three phase electrical power into first and second output phases separated from one another by approximately 180 electrical degrees and both leading a different one of the three phases of the input source by a predetermined number of electrical degrees, and a second set of three transformers, each transformer having means for transforming the input source of three phase electrical power into first and second output phases separated from one another by approximately 180 electrical degrees and both lagging a different one of the three phases of the input source by the predetermined number of electrical degrees.

13. The power distribution system of claim 12, wherein the first output phases of the first set of three transformers each lead a different one of the three phases of the input source by approximately 15 electrical degrees, the second output phases of the first set of three transformers each lead a different one of the three phases of the input source by approximately 195 electrical degrees, the first output phases of the second set of three transformers each lag a different one of the three phases of the input source by approximately 15 electrical degrees, and the second output phases of the second set of three transformers each lag a different one of the three phases of the input source by approximately 195 electrical degrees.

14. An arrangement for transforming electrical power, comprising:

conductor means for electrically connecting to an input source of three phase electrical power operating at an input source power frequency; and a transforming device electrically connected to the conductor means, the transforming device including means for transforming the input source of three phase electrical power into a first set of two output phases and a second set of two output phases, the output phases of the first set being separated from one another by approximately 180 electrical degrees and each having an output-phase frequency substantially equal to the input source power frequency, and the output phases of the second set being separated from one another by approximately 180 electrical degrees and each having an output phase frequency substantially equal to the input source power frequency, and means for reducing the level of instantaneous power drawn from the input source by shifting each output phase a predetermined number of electrical degrees from one of the three phases of the input source at the output phase frequency.

15. The arrangement of claim 14, wherein the transforming means and means for reducing the level of instantaneous power drawn from the input source include first and second transformers.

16. The arrangement of claim 15, wherein the second transformer receives plower from two phases of the three phase input source, one of which is different than two phases of the three phase input source powering the first transformer.

17. The arrangement of claim 14, wherein the predetermined number of electrical degrees is greater than zero electrical degrees and less than 180 electrical degrees.

18. The arrangement of claim 17, wherein the predetermined number of electrical degrees is approximately 30 electrical degrees.

19. The arrangement of claim 14, wherein the input source power frequency is substantially equal to 60 Hertz.

20. The arrangement of claim 14, wherein the first set of two output phases is shifted a predetermined number of electrical degrees from a different one of the three phases of the input source than the second set of two output phases.

21. A power distribution system, comprising:

two six-phase output transformers, each having means for transforming an input source of three phase electrical power into first, second, third, fourth, fifth, and sixth output phases, the first and second output phases of each transformer being separated from one another by approximately 180 electrical degrees and shifted by a predetermined number of electrical degrees from one of the three phases of the input source, the third and fourth output phases of each transformer being separated from one another by approximately 180 electrical degrees and shifted by the predetermined number of electrical degrees from one of the three phases of the input source, and the fifth and sixth output phases of each transformer being separated from one another by approximately 180 electrical degrees and shifted by the predetermined number of electrical degrees from one of the three phases of the input source.

22. The power distribution system of claim 21, wherein the predetermined number of electrical degrees is approximately 15 electrical degrees for the first, third, and fifth output phases and approximately 195 electrical degrees for the second, fourth, and sixth output phases.

23. A method of providing alternating current electrical power to a plurality of loads, including a plurality of non-linear loads which draw power from the source for only a portion of the alternating current cycle, comprising the steps of:

providing an input source of three-phase electrical power to a primary side of a power transforming device; and transforming the input power source to provide an output power source at a secondary side of the power transforming device, said output power source comprising six sets of two outputs each set having a first output shifted approximately 15 electrical degrees ahead or behind a different one of the three phases of the input source, and a second output shifted approximately 195 electrical degrees ahead or behind a different one of the three phases of the input source, the shifting reducing variations in the level of instantaneous power drawn from the input source by the loads electrically connected to the output power source which would otherwise occur due to those loads which are non-linear.

24. An arrangement for transforming electrical power, comprising:

conductor means for electrically connecting the arrangement to at least two phases of an input source of three phase electrical power; and means electrically connected to the conductor means for transforming the at least two phases of the input source into a first set of two output phases and a second set of two output phases, the output phases of the first set being separated from one another by approximately 180 electrical degrees and each shifted from one of the at least two phases of the input source by a predetermined number of electrical degrees, and the output phases of the second set being separated from one another by approximately 180 electrical degrees and each shifted the predetermined number of electrical degrees from a different one of the at least two phases of the input source;

wherein the transforming means is electrically connected to the conductor means so that a first output phase of the first set leads a first phase of the input source by approximately 15 electrical degrees, a second output phase of the first set leads the first phase of the input source by approximately 195 electrical degrees, a first output phase of the second set lags a second phase of the input source by approximately 15 electrical degrees, and a second output phase of the second set lags the second phase of the input source by approximately 195 electrical degrees, and further wherein the first phase of the input source leads the second phase of the input source by approximately 120 electrical degrees.

25. A power distribution system, comprising three four-output transformers, each having means for transforming an input source of three-phase electrical power into first, second, third, and fourth outputs, the first and second outputs being separated from one another by approximately 180 electrical degrees and shifted by a predetermined number of electrical degrees from one of the three phases of the input source, the third and fourth outputs being separated from one another by approximately 180 electrical degrees and shifted by the predetermined number of electrical degrees from one of the three phases of the input source.

26. The power distribution system of claim 25, wherein the transforming means of each transformer is electrically connected to two phases of the three-phase input source.

27. The power distribution system of claim 25, wherein the predetermined number of electrical degrees is approximately 15 electrical degrees for the first and third output phases and approximately 195 electrical degrees for the second and fourth output phases.

28. An arrangement for transforming electrical power, comprising:

conductor means for electrically connecting to an input source of three phase electrical power operating at an input source power frequency; and a transforming device electrically connected to the conductor means, the transforming device including means for transforming the input source into first, second, and third sets of two output phases, the output phases of each of the first, second, and third sets being separated from one another by approximately 180 electrical degrees and each having an output phase frequency substantially equal to the input source power frequency, and means for reducing the level of instantaneous power drawn from the input source by shifting each output phase a predetermined number of electrical degrees from one of the three phases of the input source at the output phase frequency.

29. The arrangement of claim 28, wherein the transforming means and means for reducing the level of instantaneous power drawn from the input source include first, second, and third transformers.

30. The arrangement of claim 29, wherein the second and third transformers receive power from two phases of the three phase input source, one of each of which is different than two phases of the three phase input source powering the first transformer.

31. The arrangement of claim 28, wherein the predetermined number of electrical degrees is greater than zero electrical degrees and less than 180 electrical degrees.

32. The arrangement of claim 31, wherein the predetermined number of electrical degrees is approximately 30 electrical degrees.

33. The arrangement of claim 28, wherein the input source power frequency is substantially equal to 60 Hertz.

34. The arrangement of claim 28, wherein the second and third sets of output phases are shifted a predetermined number of electrical degrees from a different phase of the three phase input source than the first set of output phases.

35. The arrangement of claim 34, wherein the second and third sets of output phases are each shifted from a different one of the three phases of the input source.

36. A method of providing a source of alternating current electrical power to a plurality of loads, including a plurality of non-linear loads which draw power from the source for only a portion of the alternating current cycle, comprising the steps of:

providing an input source of three-phase electrical power to a primary side of a power transforming device; and transforming the input power source to provide an output power source at a secondary side of the power transforming device, said output power source comprising three sets of four outputs, first and second outputs of each of the three sets each being shifted approximately 15 electrical degrees either ahead or behind a different one of the three phases of the input source and third and fourth outputs of each of the three sets each being shifted approximately 195 electrical degrees either ahead or behind a different one of the three phases of the input source so as to reduce variations in the level of instantaneous power drawn from the input source by the loads electrically connected to the output power source which would otherwise occur due to those loads which are non-linear.

37. A method of providing a source of alternating current electrical power to a plurality of loads, including a plurality of non-linear loads which draw power from the source for only a portion of the alternating current cycle, comprising the steps of:

providing an input source of three-phase electrical power to a primary side of a power transforming device; and transforming the input power source to provide an output power source at a secondary side of the power transforming device, said output power source comprising two sets of six outputs, first, second, and third outputs of each of the two sets each being shifted approximately 15 electrical degrees either ahead or behind a different one of the three phases of the input source and fourth, fifth, and sixth outputs of each of the two sets each being shifted approximately 195 electrical degrees either ahead or behind a different one of the three phases of the input source so as to reduce variations in the level of instantaneous power drawn from the input source by the loads electrically connected to the output power source which would otherwise occur due to those loads which are non-linear.

38. An arrangement for transforming electrical power, comprising:

conductor means for electrically connecting to an input source of three phase electrical power; and means electrically connected to the conductor means for transforming the input source of three phase electrical power into two output phases separated from one another by approximately 180 electrical degrees and each shifted from one of the three phases of the input source a predetermined number of electrical degrees;

wherein a first output phase of the transforming means is shifted from one of the three phases of the input source by approximately 15 electrical degrees and a second output phase of the transforming means is shifted from the same phase of the input source by approximately 195 electrical degrees.

39. An arrangement for transforming electrical power, comprising:

conductor means for electrically connecting to an input source of three phase electrical power; and means electrically connected to the conductor means for transforming the input source of three phase electrical power into two output phases separated from one another by approximately 180 electrical degrees and each shifted from one of the three phases of the input source a predetermined number of electrical degrees, the transforming means comprising:

a major primary winding electrically connected by the conductor means to two of the three phases of the input source;

a minor primary winding electrically connected by the conductor means to two of the three input phases of the input source;

a major secondary winding associated with the major primary winding and having two output phases separated by approximately 180 electrical degrees; and a pair of minor secondary windings associated with the minor primary winding, one of each of the minor secondary windings being electrically connected in series with a different one of the two output phases of the major secondary winding to produce a predetermined number of electrical degrees of phase shift between the two output phases and one of the phases of the input source.

40. The arrangement of claim 39, wherein the predetermined number of electrical degrees is approximately 15 electrical degrees for one of the two output phases of the major secondary winding and approximately 195 electrical degrees for the other output phase of the major secondary winding.

41. The arrangement of claim 39, wherein the major primary winding and major secondary winding consume approximately three times more power from the input source than the minor primary winding and the pair of minor secondary windings.

42. The arrangement of claim 39, wherein a center tap of the major secondary winding is connected to a grounded conductor.

43. An arrangement for transforming electrical power, comprising:

conductor means for electrically connecting to an input source of three phase electrical power; and means electrically connected to the conductor means for transforming the input source of three phase electrical power into two output phases separated from one another by approximately 180 electrical degrees and each shifted from one of the three phases of the input source a predetermined number of electrical degrees, the transforming means comprising:

a major primary winding electrically connected by the conductor means to one of the three phases of the input source and a neutral conductor;

a minor primary winding electrically connected by the conductor means to a different one of the three phases of the input source and the neutral conductor;

a major secondary winding associated with the major primary winding and having two output phases separated by approximately 180 electrical degrees; and a pair of minor secondary windings associated with the minor primary winding, one of each of the minor secondary windings being electrically connected in series with a different one of the two output phases of the major secondary winding to produce a predetermined number of electrical degrees of phase shift between the two output phases and one of the phases of the input source.

44. The arrangement of claim 43, wherein the predetermined number of electrical degrees is approximately 15 electrical degrees for one of the two output phases of the major secondary winding and approximately 195 electrical degrees for the other output phase of the major secondary winding.

45. The arrangement of claim 43, wherein the major primary winding and major secondary winding consume approximately three times more power from the input source than the minor primary winding and minor secondary winding.

46. The arrangement of claim 43, wherein a center tap of the major secondary winding is connected to a grounded conductor.

47. An arrangement for transforming electrical power, comprising:

conductor means for electrically connecting the arrangement to at least two phases of an input source of three phase electrical power; and means electrically connected to the conductor means for transforming the at least two phases of the input source into a first set of two output phases and a second set of two output phases, the output phases of the first set being separated from one another by approximately 180 electrical degrees and each shifted from one of the at least two phases of the input source by a predetermined number of electrical degrees, and the output phases of the second set being separated from one another by approximately 180 electrical degrees and each shifted the predetermined number of electrical degrees from a different one of the at least two phases of the input source;

wherein a first output phase of the first set is shifted from the phase of the input source by approximately 15 electrical degrees, a second output phase of the first set is shifted from the phase of the input source by approximately 195 electrical degrees, a first output phase of the second set is shifted from the different phase of the input source by approximately 15 electrical degrees, and a second output phase of the second set is shifted from the different phase of the input source by approximately 195 electrical degrees.

48. An arrangement for transforming electrical power, comprising:

conductor means for electrically connecting the arrangement to at least two phases of an input source of three phase electrical power; and means electrically connected to the conductor means for transforming the at least two phases of the input source into a first set of two output phases and a second set of two output phases, the output phases of the first set being separated from one another by approximately 180 electrical degrees and each shifted from one of the at least two phases of the input source by a predetermined number of electrical degrees, and the output phases of the second set being separated from one another by approximately 180 electrical degrees and each shifted the predetermined number of electrical degrees from a different one of the at least two phases of the input source, the transforming means comprising:

a first primary winding electrically connected by the conductor means to two of the three phases of the input source;

a second primary winding electrically connected by the conductor means to two of the three phases of the input source;

a first secondary winding associated with the first primary winding and having two output phases separated from one another by approximately 180 electrical degrees;

a second secondary winding associated with the second primary winding and having two output phases separated from one another by approximately 180 electrical degrees;

a first pair of minor secondary windings associated with the first primary winding, one of each of the first pair of minor secondary windings being electrically connected in series with a different one of the two output phases of the second secondary winding to produce a predetermined number of electrical degrees of phase shift between the two output phases of the secondary winding and one of the phases of the input source connected to the second primary winding; and a second pair of minor secondary windings associated with the second primary winding, one of each of the second pair of minor secondary windings being electrically connected in series with a different one of the two output phases of the first secondary winding to produce the predetermined number of electrical degrees of phase shift between the two output phases of the first secondary winding and one of the two phases of the input source connected to the first primary winding.

49. The arrangement of claim 48, wherein the predetermined number of electrical degrees is approximately 15 electrical degrees for first output phases of the first and second secondary windings and approximately 195 electrical degrees for second output phases of the first and second secondary windings.

50. The arrangement of claim 48, wherein center taps of the first and second secondary windings are connected to a grounded conductor.

51. An arrangement for transforming electrical power, comprising:

conductor means for electrically connecting the arrangement to at least two phases of an input source of three phase electrical power; and means electrically connected to the conductor means for transforming the at least two phases of the input source into a first set of two output phases and a second set of two output phases, the output phases of the first set being separated from one another by approximately 180 electrical degrees and each shifted from one of the at least two phases of the input source by a predetermined number of electrical degrees, and the output phases of the second set being separated from one another by approximately 180 electrical degrees and each shifted the predetermined number of electrical degrees from a different one of the at least two phases of the input source;

wherein the input source comprises first, second, and third phases and further wherein the transforming means comprises:

a first primary winding electrically connected by the conductor means to the first phase of the input source and a neutral conductor;

a second primary winding electrically connected by the conductor means to the second phase of the input source and the neutral conductor;

a first secondary winding associated with the first primary winding and having two output phases separated from one another by approximately 180 electrical degrees;

a second secondary winding associated with the second primary winding and having two output phases separated from one another by approximately 180 electrical degrees;

a first pair of minor secondary windings associated with the first primary winding, one of each of the first pair of minor secondary windings being electrically connected in series with a different one of the two output phases of the second secondary winding to produce a predetermined number of electrical degrees of phase shift between the two output phases of the second secondary winding and the second phase of the input source;

a second pair of minor secondary windings associated with the second primary winding, one of each of the second pair of minor secondary windings being electrically connected in series with a different one of the two output phases of the first secondary winding to produce the predetermined number of electrical degrees of phase shift between the two output phases of the first secondary winding and the first phase of the input source.

52. The arrangement of claim 51, wherein the predetermined number of electrical degrees is approximately 15 electrical degrees for first output phases of the first and second secondary windings and approximately 195 electrical degrees for second output phases of the first and second secondary windings.

53. The arrangement of claim 51, wherein center taps of the first and second secondary windings are connected to a grounded conductor.

54. An arrangement for transforming electrical power, comprising:

conductor means for electrically connecting the arrangement to at least two phases of an input source of three phase electrical power; and means electrically connected to the conductor means for transforming the at least two phases of the input source into a first set of two output phases and a second set of two output phases, the output phases of the first set being separated from one another by approximately 180 electrical degrees and each shifted from one of the at least two phases of the input source by a predetermined number of electrical degrees, and the output phases of the second set being separated from one another by approximately 180 electrical degrees and each shifted the predetermined number of electrical degrees from a different one of the at least two phases of the input source;

wherein the transforming means is electrically connected to the conductor means so that a first output phase of the first set lags a first phase of the input source by approximately 15 electrical degrees, a second output phase of the first set lags the first phase of the input source by approximately 195 electrical degrees, a first output phases of the second set leads a second phase of the input source by approximately 15 electrical degrees, and a second output phase of the second set leads the second phase of the input source by approximately 195 electrical degrees, and further wherein the first phase of the input source leads the second phase of the input source by approximately 120 electrical degrees.

55. An arrangement for transforming electrical power, comprising:

conductor means for electrically connecting the arrangement to at least two phases of an input source of three phase electrical power; and means electrically connected to the conductor means for transforming the at least two phases of the input source into a first set of two output phases and a second set of two output phases, the output phases of the first set being separated from one another by approximately 180 electrical degrees and each shifted from one of the at least two phases of the input source by a predetermined number of electrical degrees, and the output phases of the second set being separated from one another by approximately 180 electrical degrees and each shifted the predetermined number of electrical degrees from a different one of the at least two phases of the input source;

wherein the transforming means is electrically connected to the conductor means so that a first output phase of the first set lags a first phase of the input source by approximately 15 electrical degrees, a second output phase of the first set lags the first phase of the input source by approximately 195 electrical degrees, a first output phase of the second set leads the first phase of the input source by approximately 15 electrical degrees, and a second output phase of the second set leads the first phase of the input source by approximately 195 electrical degrees.

* * * * *